(12) United States Patent
DeLean et al.

(10) Patent No.: US 9,305,229 B2
(45) Date of Patent: Apr. 5, 2016

(54) METHOD AND SYSTEM FOR VISION BASED INTERFACING WITH A COMPUTER

(71) Applicants: Bruno DeLean, Andorra La Vella (ID); Guy Le Henaff, Montreal (CA)

(72) Inventors: Bruno DeLean, Andorra La Vella (ID); Guy Le Henaff, Montreal (CA)

(*) Notice: Subject to any disclaimer, the term of this patent is extended or adjusted under 35 U.S.C. 154(b) by 401 days.

(21) Appl. No.: 13/688,463

(22) Filed: Nov. 29, 2012

(65) Prior Publication Data

US 2014/0029789 A1 Jan. 30, 2014

Related U.S. Application Data

(60) Provisional application No. 61/677,159, filed on Jul. 30, 2012.

(51) Int. Cl.
| | | |
|---|---|---|
| *G06K 9/00* | (2006.01) | |
| *G06K 9/20* | (2006.01) | |
| *G06F 3/01* | (2006.01) | |
| *G06K 9/62* | (2006.01) | |
| *G06F 3/00* | (2006.01) | |

(52) U.S. Cl.
CPC ........ *G06K 9/20* (2013.01); *G06F 3/005* (2013.01); *G06F 3/017* (2013.01); *G06K 9/00389* (2013.01); *G06K 9/6277* (2013.01)

(58) Field of Classification Search
None
See application file for complete search history.

(56) References Cited

U.S. PATENT DOCUMENTS

| | | |
|---|---|---|
| 4,758,829 A | 7/1988 | Smith, III |
| 5,105,375 A | 4/1992 | Lapeyre |
| 5,203,704 A | 4/1993 | McCloud |
| 5,426,450 A | 6/1995 | Drumm |
| 5,454,043 A | 9/1995 | Freeman |
| 5,473,705 A | 12/1995 | Abe et al. |
| 5,699,441 A | 12/1997 | Sagawa et al. |
| 5,767,842 A | 6/1998 | Korth |
| 5,818,437 A | 10/1998 | Grover et al. |
| 5,982,352 A | 11/1999 | Pryor |
| 6,061,064 A | 5/2000 | Reichlen |
| 6,072,494 A | 6/2000 | Nguyen |
| 6,104,384 A | 8/2000 | Moon et al. |
| 6,128,003 A | 10/2000 | Smith et al. |
| 6,252,598 B1 | 6/2001 | Segen |
| 6,281,878 B1 | 8/2001 | Montellese |
| 6,359,572 B1 | 3/2002 | Vale |
| 6,388,657 B1 | 5/2002 | Natoli |
| 6,512,838 B1 | 1/2003 | Rafii et al. |

(Continued)

OTHER PUBLICATIONS

Canadian Intellectual Property Office, "International Search Report", "from PCT Application No. PCT/CA2013/000675", Sep. 20, 2013, pp. 1-3, Published in: CA.

(Continued)

*Primary Examiner* — Atiba O Fitzpatrick
(74) *Attorney, Agent, or Firm* — Fogg & Powers LLC

(57) ABSTRACT

System and method which allow a user to interface with a machine/computer using an image capturing device (e.g. camera) instead of conventional physical interfaces e.g. keyboard, mouse. The system allows the user to interface from any physical and non-physical location within the POV of the camera at a distance that is determined by the resolution of the camera. Using images of the hand, the system may detect a change of hand states. If the new state is a known state that represents a hit state, the system would map the change of state to a key hit in a row and column of the keyboard and sends the function associated with that key for execution. In an embodiment, the system determines the row based on the rotation of the wrist and/or position of the hand.

24 Claims, 18 Drawing Sheets

(56) References Cited

U.S. PATENT DOCUMENTS

| | | | |
|---|---|---|---|
| 6,594,616 B2 | 7/2003 | Zhang et al. | |
| 6,600,480 B2 | 7/2003 | Natoli | |
| 6,614,422 B1 | 9/2003 | Rafii et al. | |
| 6,674,895 B2 | 1/2004 | Rafii et al. | |
| 6,690,354 B2 | 2/2004 | Sze | |
| 6,710,770 B2 | 3/2004 | Tomasi et al. | |
| 6,720,949 B1 | 4/2004 | Pryor et al. | |
| 6,770,864 B2 | 8/2004 | Yan | |
| 6,788,809 B1 | 9/2004 | Grzeszczuk et al. | |
| 7,071,924 B2 | 7/2006 | Wilbrink et al. | |
| 7,084,857 B2 | 8/2006 | Lieberman et al. | |
| 7,151,530 B2 | 12/2006 | Roeber et al. | |
| 7,308,112 B2 | 12/2007 | Fujimura et al. | |
| 7,340,077 B2 | 3/2008 | Gokturk et al. | |
| 7,343,026 B2 | 3/2008 | Niwa et al. | |
| 7,379,563 B2 | 5/2008 | Shamaie | |
| 7,499,569 B2 | 3/2009 | Sato et al. | |
| RE40,880 E | 8/2009 | DuFaux | |
| RE40,993 E | 11/2009 | Westerman | |
| 7,755,608 B2 | 7/2010 | Chang et al. | |
| 7,774,075 B2 | 8/2010 | Lin | |
| 7,810,050 B2 | 10/2010 | Hirai et al. | |
| 7,821,531 B2 | 10/2010 | Yoda et al. | |
| 7,844,914 B2 | 11/2010 | Andre et al. | |
| 8,686,943 B1 * | 4/2014 | Rafii | 345/158 |
| 8,723,789 B1 * | 5/2014 | Rafii | 345/156 |
| 8,836,768 B1 * | 9/2014 | Rafii et al. | 348/47 |
| 8,854,433 B1 * | 10/2014 | Rafii | 348/47 |
| 2004/0104941 A1 | 6/2004 | Natoli | |
| 2005/0206730 A1 | 9/2005 | Hagiwara | |
| 2006/0077179 A1 | 4/2006 | Hsu et al. | |
| 2006/0274051 A1 | 12/2006 | Longe et al. | |
| 2008/0089587 A1 | 4/2008 | Kim et al. | |
| 2009/0109175 A1 | 4/2009 | Fein et al. | |
| 2009/0160767 A1 | 6/2009 | Sugaya et al. | |
| 2009/0315740 A1 | 12/2009 | Hildreth et al. | |
| 2010/0156787 A1 | 6/2010 | Katayama | |
| 2010/0177035 A1 | 7/2010 | Schowengerdt et al. | |
| 2010/0199228 A1 | 8/2010 | Latta et al. | |
| 2010/0214226 A1 | 8/2010 | Brown et al. | |
| 2010/0231522 A1 | 9/2010 | Li | |
| 2010/0259561 A1 | 10/2010 | Forutanpour et al. | |
| 2010/0277414 A1 | 11/2010 | Tartz et al. | |
| 2010/0313160 A1 | 12/2010 | Mossakowski | |
| 2011/0074675 A1 | 3/2011 | Shiming et al. | |
| 2011/0102570 A1 | 5/2011 | Wilf et al. | |
| 2011/0119640 A1 | 5/2011 | Berkes et al. | |
| 2011/0291926 A1 | 12/2011 | Gokturk et al. | |
| 2011/0291945 A1 * | 12/2011 | Ewing et al. | 345/173 |
| 2012/0076369 A1 | 3/2012 | Abramovich et al. | |
| 2013/0154913 A1 * | 6/2013 | Genc et al. | 345/156 |

OTHER PUBLICATIONS

Crowley et al., "Finger Tracking as an Input Device for Augmented Reality", Jun. 1995, pp. 1-6, Publisher: LIFIA-IMAG, LGHMAG, Grenoble.

Fujiyoshi et al., "Real-Time Human Motion Analysis by Image Skeletonization", Jan. 2004, pp. 113-120, vol. E87-D, No. 1, Publisher: IEICE Trans. Inf. & Syst.

Kehl et al., "Real-Time Pointing Gesture Recognition for an Immersive Environment", "Computer Vision Laboratory", May 2004, pp. 1-6, Publisher: Swiss Federal Institure of Technology, Published in: Zurich.

Keskin et al., "Real Time Hand Tracking and 3D Gesture Recognition for Interactive Interfaces using HMM", 2003, pp. 1-4, Publisher: Bogazici University.

Kiryati et al., "Real-time Abnormal Motion Detection in Surveillance Video", Dec. 2008, pp. 1-4, Publisher: Tel Aviv University, Massachusetts Institute of Technology.

Patron-Perez et al., "A Probabilistic Framework for Recognizing Similar Actions using Spatio-Temporal Features", 2007, pp. 1-10, Publisher: Department of Engineering Science, University of Oxford.

Romero et al., "Hands in Action: Real-Time 3D Reconstruction of Hands in Interaction with Objects", May 2010, pp. 1-6.

* cited by examiner 0 degree axis

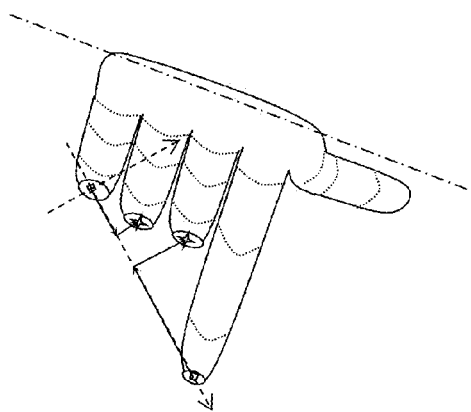 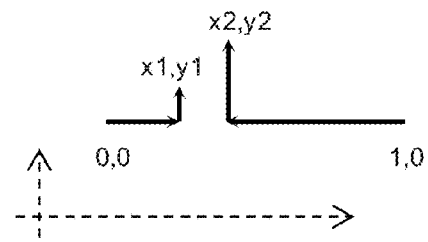
FIGURE 4a-1　　　　　FIGURE 4a-2
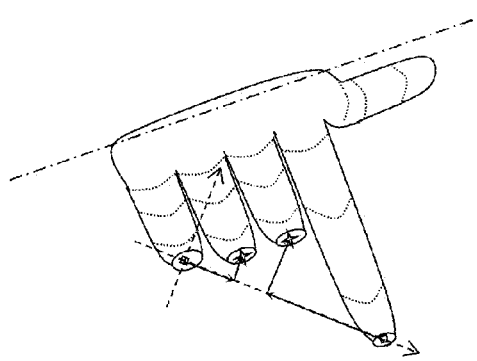 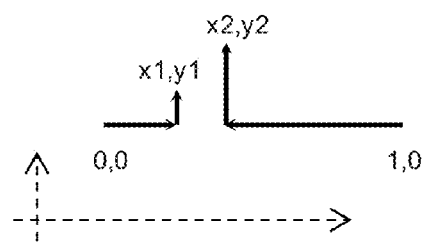
FIGURE 4b-1　　　　　FIGURE 4b-2
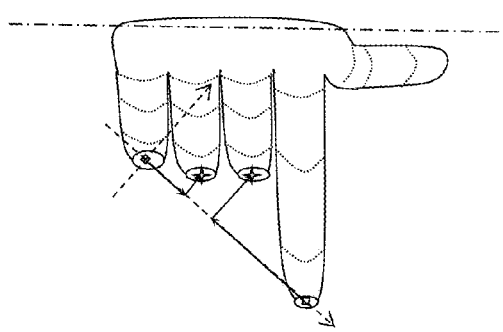 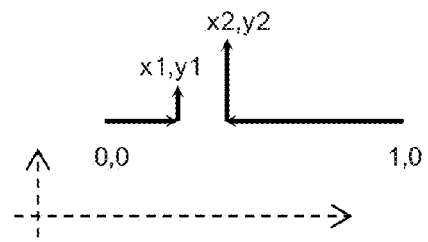
FIGURE 4c-1　　　　　FIGURE 4c-2

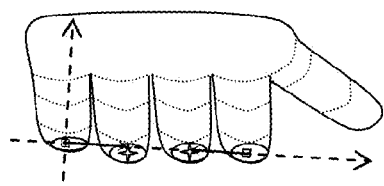
FIGURE 11a-1
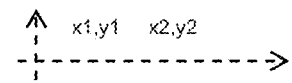
FIGURE 11a-2
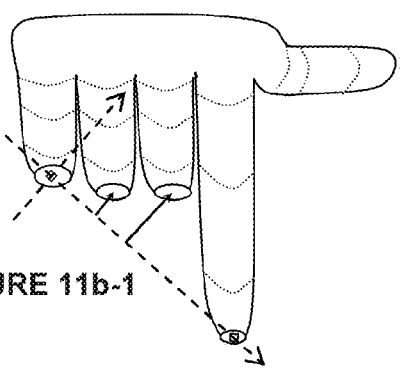
FIGURE 11b-1
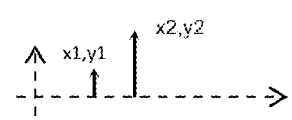
FIGURE 11b-2
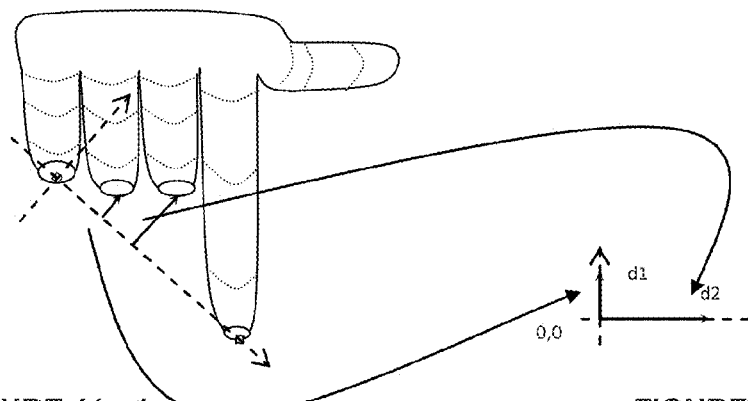
FIGURE 11c-1
FIGURE 11c-2
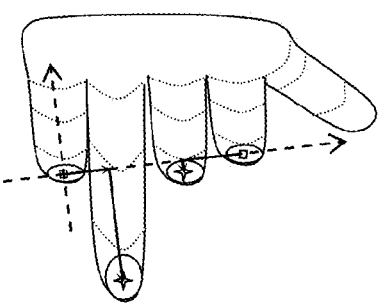
FIGURE 11d-1
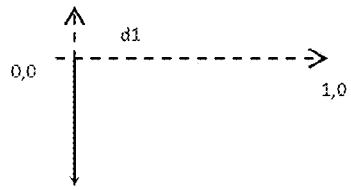
FIGURE 11d-2

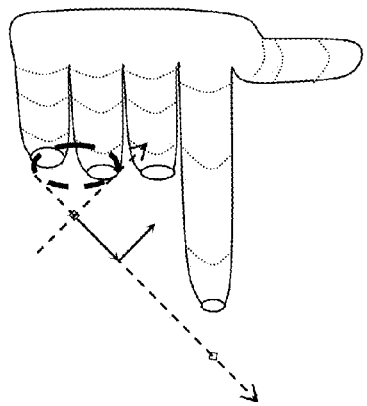
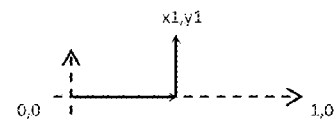
FIGURE 15a-1  FIGURE 15a-2
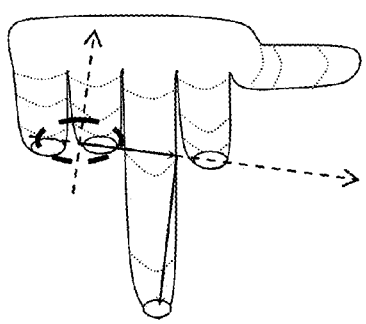
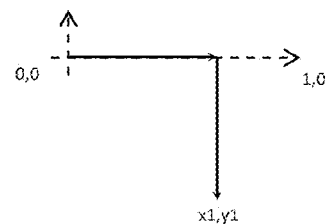
FIGURE 15b-1  FIGURE 15b-2
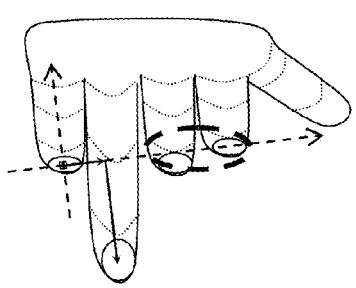
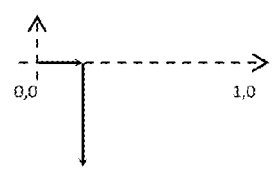
FIGURE 15c-1  FIGURE 15c-2

METHOD AND SYSTEM FOR VISION BASED INTERFACING WITH A COMPUTER

CLAIM OF PRIORITY

This patent application claims the benefit of priority, under 35 U.S.C. Section 119(e), to U.S. Provisional Patent Application Ser. No. 61/677,159 entitled "METHOD AND SYSTEM FOR VISION BASED INTERFACING WITH A COMPUTER," filed on Jul. 30, 2012, which is hereby incorporated by reference herein in its entirety.

BACKGROUND

1. Field

The subject matter disclosed generally relates to the field of human-machine interfacing. More particularly, the subject matter relates to a method and system for interfacing with a computer using a vision based mechanism.

2. Related Prior Art

Using some form of gesture recognition to interact with a machine/computer is the subject of research and development for decades, but technical difficulties associated with this subject have imposed various limitations which impair the usefulness of the existing solutions.

Existing solutions either use distant vision (in the order of meters) that focuses on very specific gestures of objects not smaller than a hand, or short distance vision (in the order of centimeters) that focuses on either a single finger or some easy convex posture of fingers in a simplified scene.

The content of the scene is also a determinant factor that eases an implementation of gesture recognition. Scene segmentation had always been an issue. The most sophisticated object recognition solution is able to deal with two dimensional images only, while many other simplified solutions benefit from the availability of affordable sensors delivering depth information. Solutions based on depth sensors became very popular because they ease most of the artificial image recognition and interpretation. These sensors allow simplified scene segmentation using methods as crude as defining a "volume of engagement" which merely establishes the start of analysis on the most luminous object. In case of depth sensors the concept of luminosity is a transposition of and designated the closest. Several issues exist with depth sensors as well as with structured light based sensors (or stereoscopic based) and their limitations extend to both long distance and short distance usage. With regard to the long distance usage, the lack of precision is incompatible with small object like fingers. The smallest viable object is hand size. Additionally, the long distance resolution of depth is also a restriction that cannot be overcome as easily with high resolution 2D sensor or lens. Short distance is also an issue: interaction close to a monitor or a touchpad requires that fingers be at short distance, within 50 cm or even 20 cm of the sensors. This is too close to sensors to allow take-up.

Accordingly, the requirements of take-up in the prior art systems are always an issue. The technical difficulties associated with gesture recognition have increased the number of prior art solutions. The prior art can be typically divided between user Interface methods and object recognition methods.

User Interface prior art generally include wide scope description of usage, the intention is described but the analysis is always vague, which raises questions regarding the enablement of such systems. Examples of user interface references include: U.S. Pat. No. 6,359,572; U.S. Pat. No. 7,877,706; U.S. Pat. No. 7,821,531; and US20100199228.

Object recognition prior art put the main focus on the harsh reality of problems related to object and gesture recognition, and take into consideration the gesture of the body or hands or single finger. This type of prior art however, does not extend to the individual nor collective movement of the fingers. Examples of object recognition references include: U.S. Pat. No. 6,256,598; US200902524231; U.S. Pat. No. 6,788,809;

Solutions which use distant vision associate a body gesture to a function, key, or word. See for example US20100199228. The hand gesture shown in FIG. 5a of this reference signals the character "a", and the hand gesture shown in FIG. 5b signals the word "cat". The major limitation with this type of solutions is the lack of efficiency and speed in interfacing with the machine, not to mention the fatigue associated with moving the entire hand or head for entering a single character or function.

On the other hand, solutions which use short distance vision limit the user to a specific location (physical and non-physical) for interfacing with the machine.

For example U.S. Pat. No. 5,767,842 (Korth) describes a system in which the keyboard is optically produced on a surface. Korth (U.S. Pat. No. 5,767,842) assumes a clean background and contrasts the color of the hand/wrist with the color of the background in order to detect the presence of the hand. The hand contour system is then followed in order to detect the fingers and the location of their tips.

In addition to being limited to a specific location, the method of Korth is subject to inherent ambiguities arising from the reliance upon relative luminescence data, an adequate source of ambient lighting, and a clean background. For example, from the vantage point of Korth's video camera, it would be very difficult to detect typing motions along the axis of the camera lens. Therefore, multiple cameras having different vantage points would be needed to adequately capture the complex keying motions. Also, as suggested by Korth's FIG. 1, it can be difficult merely to acquire an unobstructed view of each finger on a user's hands, e.g., acquiring an image of the right forefinger is precluded by the image-blocking presence of the right middle finger, and so forth. In short, even with good ambient lighting and a good vantage point for his camera, Korth's method still has many shortcomings, including ambiguity as to what row on a virtual keyboard a user's fingers is touching.

The Korth approach may be replicated using multiple two-dimensional video cameras, either for stereoscopic reconstruction or for implementing different method of search from different point of view each aimed toward the subject of interest from a different viewing angle. As simple as this proposal sounds, it is not practical. The setup of the various cameras is cumbersome and potentially expensive as duplicate cameras are deployed. Each camera must be calibrated accurately relative to the object viewed, and relative to each other. To achieve adequate accuracy, the stereo cameras would have to be placed at the top left and right positions relative to the keyboard. The principle of stereo reconstruction requiring analysis of tonal difference is also too sensitive to lighting conditions compared to the required accuracy necessary. Yet even with this configuration, the cameras would be plagued by fingers obstructing fingers within the view of at least one of the cameras. Further, the computation required to create three-dimensional information from the two-dimensional video image information output by the various cameras contributes to the processing overhead of the computer system used to process the image data. Understandably, using multiple cameras would substantially complicate Korth's signal processing requirements, and increase power consumption.

Another solution is provided in U.S. Pat. Nos. 6,614,422 and 6,710,770 (Rafii). Similar to Korth, Rafii uses a projector for projecting the image of a keyboard on a surface, and uses a three dimensional sensor in order to capture the position of the finger on the keyboard projected on the surface. In addition to requiring a surface to type on and limiting the user to a specific location, the system of Rafii has at least two major drawbacks. The first drawback is the difficulty to detect the hit due to sensor precision constraints on the user vertical axis. In particular, since the camera POV is above the user to track fingers rows displacement, the hit movement detection is in an unfavorable situation and requires very high precision that should impose requirements for wide vertical movements, otherwise spurious hits can be detected. The second drawback is the power consumption. The camera uses the TOF (time of flight) or light, and requires high speed electronics which lead to unacceptable tradeoffs between high power consumption for precise electronics (higher speed) and lower consumption which reduce dramatically the choice of technology available to detect a glimpse instant like the time for light to travel from sensors emitter to fingers then back to receiver which is in the picoseconds range. Additionally, the Rafii approach requires controlled illumination for sensors similar to the radar principle. This approach is also prone to errors when used in an exterior environment or highly lighted places where the light tends to increase background noise for the sensors, which for safety and cost reasons work in a extension of visible light spectrum that are still part of the light emitted by the sun.

A further solution is described in US20100231522 (Li). Li describes different implementations in this reference. In the implementation where only one camera is used, such as in FIG. 5, the user's finger should contact a predetermined input region ABCD on a physical surface. In the implementation where the user types in the air, the system requires two video capturing devices as shown in FIG. 22. In the latter implementation, the user is also limited to typing in an input region which lies in an input plane. The input plane (that can be assimilated as a virtual desk top) has to be perpendicular to the line of sight of the video capturing devices. Accordingly, in both implementations the user is limited a specific input region for typing and/or interfacing with the computer. When it comes to the second implementation which allows for typing in the air, it would not be realistic to use Li because the necessary input plane is unseen and must be perpendicular to the line of sight of the video capturing devices. Therefore, it is very easy for the user to type in the wrong place and enter different characters than what they intended to enter. If the paradigm looks close to a keyboard emulation, it is in fact requiring a very new training from the user as the wrist needs to be bent and the hit plane does not materialize (as in Korth). Therefore, merely considering the movement of the hit is not sufficient. Furthermore, Li does not address the various technical difficulties associated with typing in the air. Moreover, the use of a stereovision system is cumbersome, expensive and complicated as discussed above in connection with Korth.

What is needed is a method and system by which a user may input data to a machine/computer using a virtual keyboard or other virtual input device with low computation cost and without being limited to a specific location. The present embodiments provide such method and system.

SUMMARY

The terms "line of sight" of a camera and "point of view" (aka POV) of a camera are intended to mean the coverage area of the camera.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 3a-1 illustrates a hand in a relaxed state;
FIG. 3a-2 illustrates the vector signature of the hand state in FIG. 3a-1,
FIG. 3b-1 illustrates a hit state with the index down;
FIG. 3b-2 illustrates the vector signature of the hand state in FIG. 3b-1;
FIG. 3c-1 illustrates a hit state with the major down;
FIG. 3c-2 illustrates the vector signature of the hand state in FIG. 3c-1,
FIG. 3d-1 illustrates another hit state with the major down;
FIG. 3d-2 illustrates the vector signature of the hand state in FIG. 3d-1;
FIG. 3e-1 illustrates a hit state with the ring finger down;
FIG. 3e-2 illustrates the vector signature of the hand state in FIG. 3e-1;
FIG. 3f-1 illustrates a hit state with the annular finger down;
FIG. 3f-2 illustrates the vector signature of the hand state in FIG. 3f-1,
FIGS. 4a-1 to 4c-2 illustrate the same hand state in different hand orientations along with the vector signature for each orientation;

FIG. 6b is a graph illustrating a normalized version of the probabilities illustrated in the graph of FIG. 6a;

FIGS. 11a-1 to 11d-2 represent different hand postures with their respective vectors signatures, in the hypothetical 2d example;

FIGS. 15a-1 to 15C-2 illustrate different hand states and their corresponding vector signatures using the two-finger approach;

It will be noted that throughout the appended drawings, like features are identified by like reference numerals.

DETAILED DESCRIPTION

Embodiments of the invention describe a system and method which allow a user to interface with a machine/computer using an image capturing device (e.g. 2D camera) instead of conventional physical interfaces e.g. keyboard, mouse. The system allows the user to interface from any physical and non-physical location within the POV of the image capturing device at a distance that is determined by the resolution of the camera. Using images of the hand, the system detects a change of hand states. If the new state is a known state that represents a hit state, the system would map the change of state to a key hit in a row and column of the keyboard and sends the function associated with that key for execution. In an embodiment, the system determines the row based on the rotation of the wrist.

The following embodiments will be described with reference to a camera as an example of an image feed device. However, it should be noted that the image feed device may include other sensors like a 3D camera, radar or the like. In another embodiment, the information may be obtained through different methods as long as these methods provide feature set positions made of fingertips. For example the information may be obtained from marked tips, as well as predigested information like the information obtained from fingers goniometric sensors as used in a VR modeling "data glove".

Once obtained, the information should be processed to extract two main components. The first component to be extracted is one or more feature sets that have a certain degree of relevancy to a human hand in a typing position. The second component is the classification of features set. The implicit nature of the problem will have to cope with many plausible configuration of true or false assembly of features. However even once such a set is determined the classification of the user intent still requires some further analysis and speculation. Therefore, when considering typing in the air even if the sensor is very specific like a data glove which safely delivers a deterministic single well formed set of features, further processing would still be required to classify the feature sets and determine the probability that the movement represents a new state.

Figure 1:
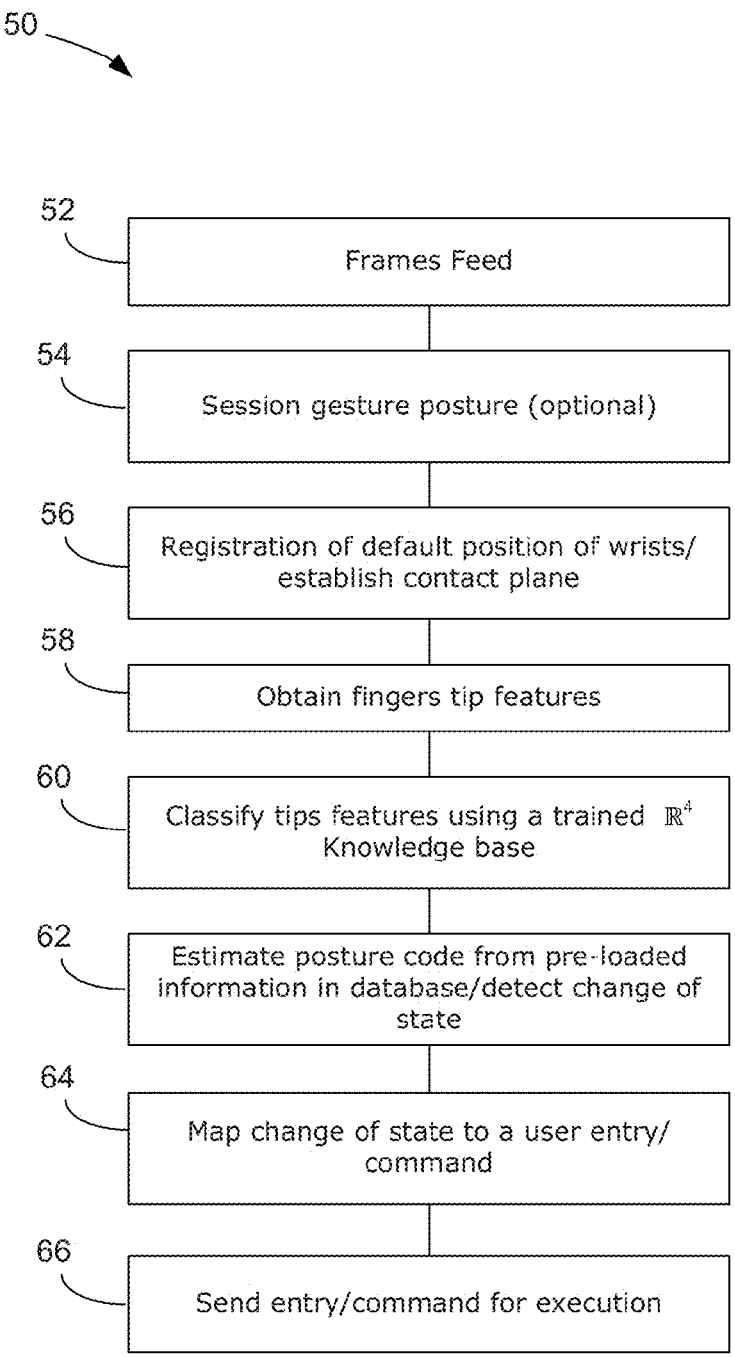
FIG. 1 is a flowchart illustrating the general steps of a method for interfacing with a computer using a virtual input device, in accordance with the present embodiments.

FIG. 1 is a flowchart illustrating the general steps of a method for interfacing with a computer using a virtual input device, in accordance with an embodiment.

Figure 2A:
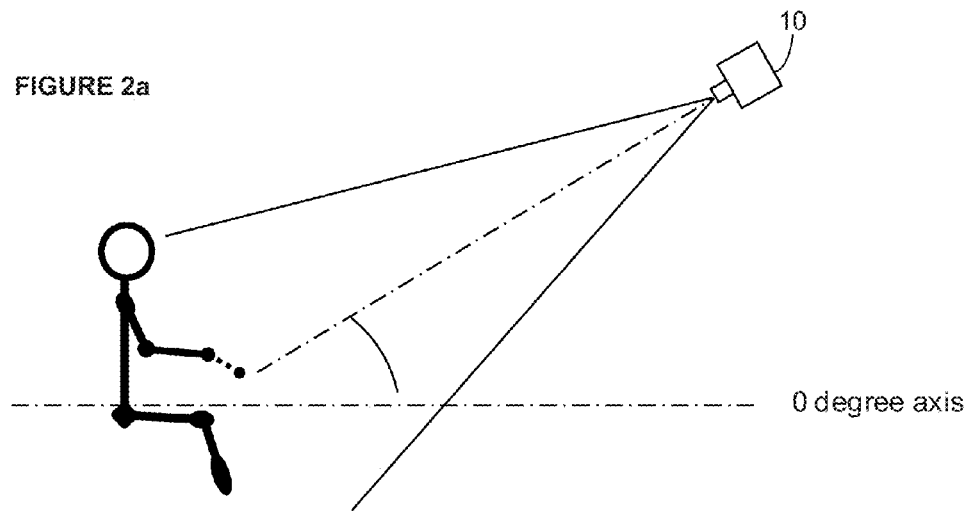
FIG. 2a illustrates an example of an image feed position in which a 2D camera is distant from and above the user, wherein the user's fingers are within the POV of the camera.
Figure 2B:
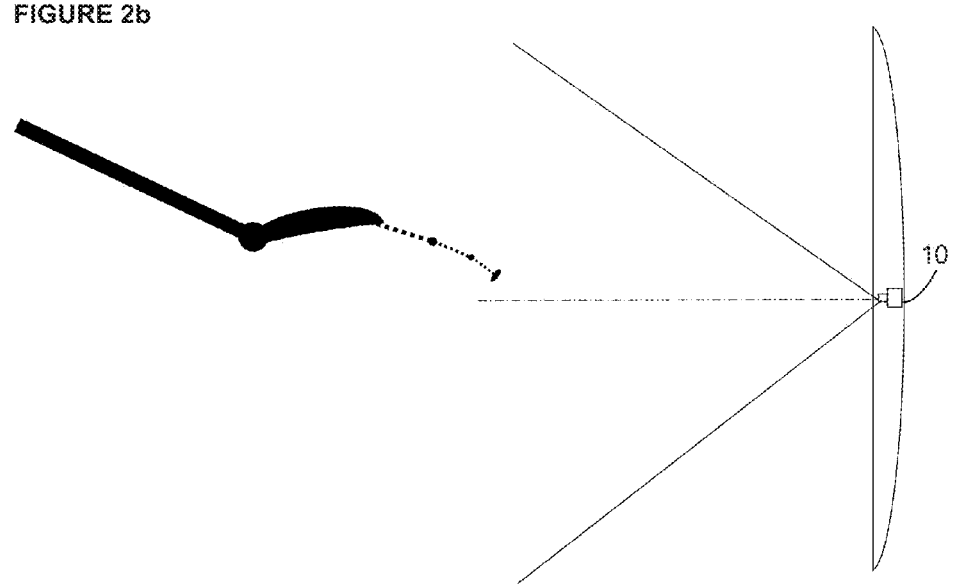
FIG. 2b illustrates another example of an image feed position in which a 2D camera is distant from and above the user, wherein the user's fingers are within the POV of the camera.

The method 50 begins at step 52 by receiving a frame feed from an image feed device (camera). FIG. 2a illustrates an example of an image feed position in which a 2D camera 10 is distant from and above the user, wherein the user's fingers are within the POV of the camera 10. FIG. 2b illustrates another example of an image feed position in which a 2D camera 10 is distant from and above the user, wherein the user's fingers are within the POV of the camera 10. It should be noted that other image feed positions are also possible as long as the user's fingers and wrists are within the POV of the camera 10.

The same embodiment allows multiplicity of strategy for camera positioning.

Figure 2C:
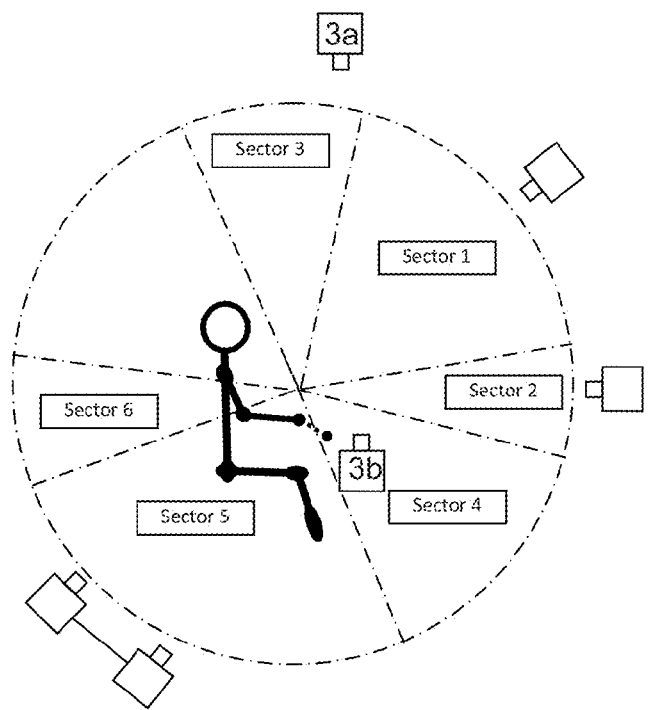
FIG. 2c illustrates variations of camera/sensor positions that may used for detecting the finger movements of a user, in accordance with a further embodiment.

FIG. 2c illustrates variations of camera/sensor positions that may used for detecting the finger movements of a user, in accordance with a further embodiment. Each sector could justify a different implementation strategy or tuning for the image feed, some sector may benefit from a depth sensor.

User is shown in one of many possible postures here seated, hands in relaxed position. Sector 1 define the typical implementation, wherein the angles may range from 10 to 80 degree whereby a good quality 2 d camera can be used. Sector 2 may be of special interest if the sensor is capable of delivering depth information which may simplify row selection. Row selection can be done by moving horizontally the hand, the hand being a kind of blob where the average barycenter is detected (in typical case where depth sensor doesn't have sufficient discrimination to detect fingers individually with a good enough repetition).

Sector 3 may be achieved by a sensor provided somewhere on the top between the user and the screen as shown by sensor 3a, or somewhere on the bottom such as on a desk close to the screen as shown by sensor 3b.

Sector 4 is typically achieved with sensors that are underneath or over the hand horizon.

Sector 5 Can be achieved with 2 cameras provided in the seat (or otherwise) behind the user for delivering a synchronized feed including a view of both hands in a mixed feed for submission to the apparatus. (e.g. one for each hand). In an embodiment the camera may be imbedded in the sides of an armchair. In this case the cameras would be potentially close to the user, then the appearance of the hands just in front of them could be sufficient to begin a session without requiring a trigger gesture as discussed above.

At step 54 the method detects if the hand is in a session posture position. For instance, the system may be trained to open a session when the user's hands or fingers are in a specific position. The session gesture position may be pre-programmed in the system and may also be entered/chosen by the user when performing the out-of-box training for the system.

At step 56, the method registers the position of the wrists in order to establish a virtual/physical reference plane for the user's fingers with the virtual input device. In an embodiment, the reference plane does not need to be the same for both hands. Whether the user is typing in the air or on a physical surface, the system in accordance with the present embodiments can establish the hit movement as being on the reference plane based on the position of the wrist line. This allows the user to type from any location within the POV of the camera 10 without having to be limited to a specific location (whether physical or virtual).

At step 58, the method obtains the fingers' tip features. In an embodiment, detecting the fingertip features comprises detecting the shape of the nails. For example, each fingertip may be considered as a pattern with a peculiar aspect, mainly due by the presence of the nail. Tips detection may be done with a search for matches in the frame. The search may start from a Centre of Interest (COI) based on a center of gravity (COG) from a blob of the hand, mixed with an estimate from previous analysis. Then, a spiral search may be performed until a sufficient pattern match is found with a similarity beyond a minimal threshold, this threshold may be dynamically adjusted during run time. Tips pattern may be taken from a database of aspect and geometrically modified and tested on first frames of an open session to find best matches. The selectivity and chances of success may be the outcome of a pre-processing applied on each frame. However, a training phase by the user allows a direct setup of best tips pattern. In an embodiment, a first level of coherency is asserted when assembling clusters of 4 patterns, with rules likes non overlapping, consecutive along the X axis, and where the bounding box of it gives a ratio X/2 not greater than 1.75 (Dynamic parameter).

In an embodiment, while doing massive elimination of non sensible configuration of tips the coherency analysis may still generate many plausible tips arrangement, typically in the order of 10000. This is due to the deliberate choice of loose criteria on pattern detection on tips, in order to avoid missing the real target tips hidden in a noisy situation. Then the burden of the detection is left to the classification step where a very precise and specific classification of these arrangements need to be done to find the arrangement that most likely represent the state of the hand.

At step 60, the method classifies the tip features using a trained $\mathbb{R}^4$ knowledge base. The intent here is to compare all geometrically potential plausible arrangement of features as a set of 4 points to a set of possible mutation of hand gesture loaded in a Knowledge Base "KB". The Knowledge Base may be preloaded with standardized aspect of mutation and may be adjusted with user entered data issued from a training phase. The Knowledge Base may store a sequence of all models defined from a relaxed state to a hit state or from a hit state to another hit state without passing by the relaxed position.

Using these vectors of state aspect along a plausible trajectory create 4D volumes. The representation of such volumes to humans is not needed and cannot be done even in perspective because humans need to visualize the domains, whereas for machines (computers) an additional domain is just another variable used to index a position. These volumes are frequently used to help researchers obtain a better view of the global comportment. But when dealing with non human dimensions, a level of abstraction is required which is of a higher magnitude. In the present example, a 4D volume is used because intuitively the input is received from four fingers (excluding the thumb which is not typically used for typing characters in addition to the fact that its tips do not usually appear when the camera is facing the user). If the input was received from the five fingers an 8D volume could have been used which again is beyond drawing capability. The 4D volume may however be estimated as a trumpet shaped volume with a rounded top of the wide side. The hit position is near the top of the wide side, each volume has absolute possible edge (side fingers) or may be overlapping with portions of the other volumes (centre fingers).

As discussed above, the system searches for a cluster of four consecutive non-overlapping fingers (excluding the thumb). Embodiments of the invention transform a 2D image of the hand into a cluster of four vectors. The vectors may be anchored on the COG of the nails, whereby each COG defines the beginning/end of a vector, all referring to a naturally flexible referential established as an orthonormal referential but aligned on the first and last COG and normed to one as explained later.

Figures 1, 3A:
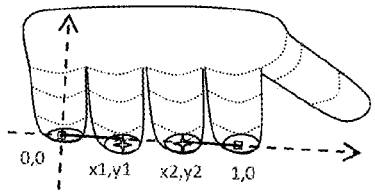
Figures 2, 3A:
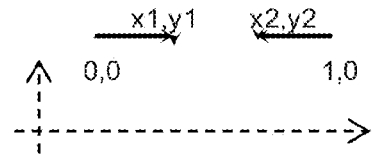
Figures 1, 3B:
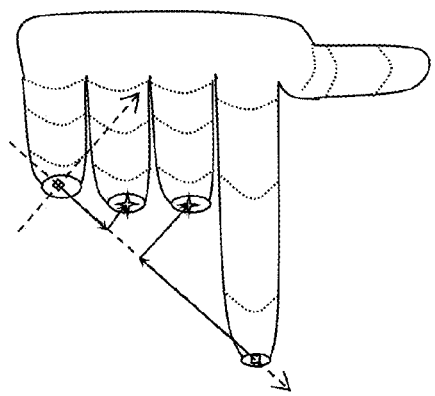
Figures 2, 3B:
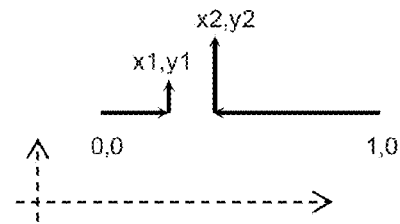
Figures 1, 3C:
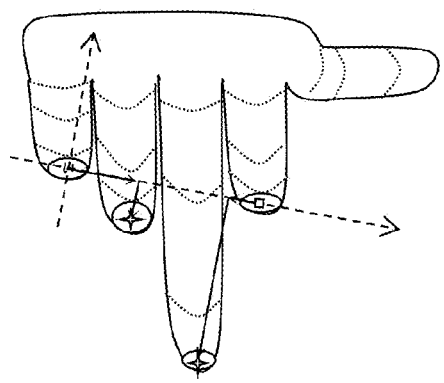
Figures 2, 3C:
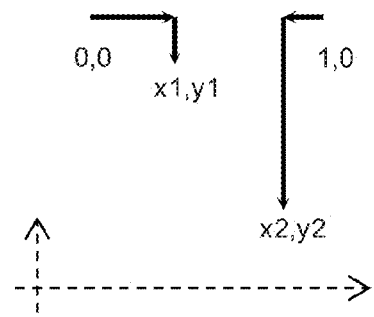
Figures 1, 3D:
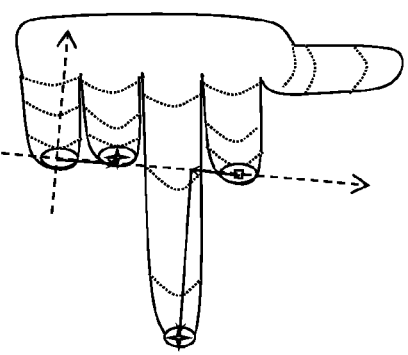
Figures 2, 3D:
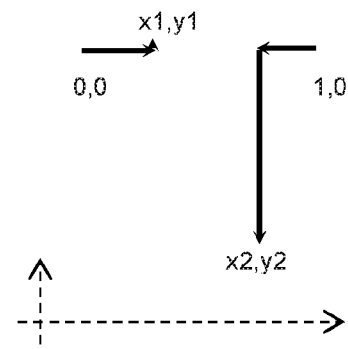
Figures 1, 3E:
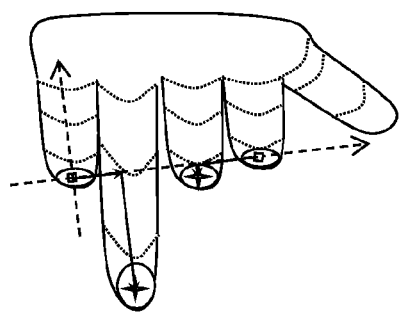
Figures 2, 3E:
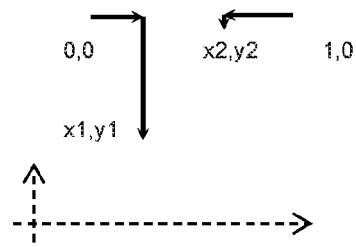
Figures 1, 3F:
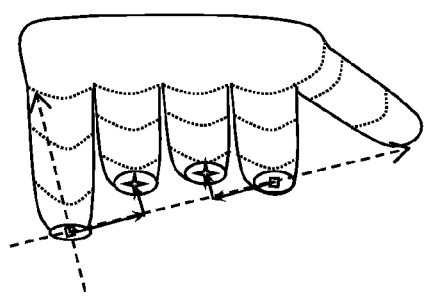
Figures 2, 3F:
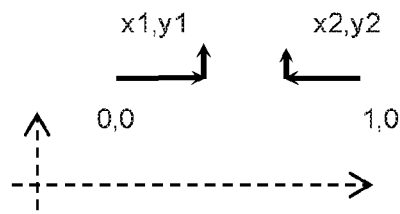

The vector signatures are defined based on the position of the fingertips with respect to each other, and thus each hand state has a unique vector signature. FIGS. 3*a*-1 to 3*f*-2 illustrates different known hand states along with their vector signatures, in accordance with an embodiment. In particular, FIG. 3*a*-1 illustrates a hand in a relaxed state. FIG. 3*a*-2 illustrates the vector signature of the hand state in FIG. 3*a*-1. FIG. 3*b*-1 illustrates a hit state with the index down. FIG. 3*b*-2 illustrates the vector signature of the hand state in FIG. 3*b*-1. FIG. 3*c*-1 illustrates a hit state with the major down. FIG. 3*c*-2 illustrates the vector signature of the hand state in FIG. 3*c*-1. FIG. 3*d*-1 illustrates another hit state with the major down. FIG. 3*d*-2 illustrates the vector signature of the hand state in FIG. 3*d*-1. FIG. 3*e*-1 illustrates a hit state with the ring finger down. FIG. 3*e*-2 illustrates the vector signature of the hand state in FIG. 3*e*-1. FIG. 3*f*-1 illustrates a hit state with the little finger down. FIG. 3*f*-2 illustrates the vector signature of the hand state in FIG. 3*f*-1.

In the present embodiment, the reference axis (hereinafter X-axis) is defined by the COG of the first and last fingers (little finger and index). The vectors of the little finger and ring finger may be grouped together as a set of two vectors which are perpendicular to each other, and the vectors of the major and index are grouped together as a set of two vectors which are perpendicular to each other. In an embodiment, magnitude of the vectors which are parallel to the X-axis is based on the distance between the COG of the adjacent fingers while the magnitude of the vectors which are perpendicular to the X-axis is based on the distance between the COG of the corresponding finger and the X axis. As shown in FIGS. 3*a*-1 to 3*f*-2, the vector signature for each hand position is different from the vector signature of the other hand positions.

In the vector classification method of the present embodiment, the vector signature of each state depends on the positions of the fingers with respect to each other irrespective of the angle that the hand/wrist makes with the horizontal axis. In other words, the wrists do not have to be in a horizontal plane to allow the user to interface with the computer. FIGS. 4*a*-1 to 4*c*-2 illustrate the same hand state in different hand orientations along with the vector signature for each orientation. This method of vector classification allows for invariance at least in scale in the translation and rotation of the whole hand. This allows for using the rotation of the hand as available parameter for performing a certain function such as for example to change or indicate selected row.

Accordingly, a user whose hands are within the POV of the camera may interface with the computer without an input device and irrespective of whether the user is sitting, standing or lying down. Depending on the resolution and performance of the camera, the user may be in the range of few meters far from the camera. For example, a 45-degrees aperture camera with a standard resolution of 1920 pixels wide, allows for about 20 pixels resolution for the fingertips at 1.4 meters. A 20-degrees aperture allows for 3 to 4 meters, but the user need to be more precisely facing sensors. (At 4 meters the "windows" of the FOV is about 1.5 meters). A multiplicity of narrowed cameras (20 deg) looking at different angles may be used to increase the field of view simply by horizontal concatenation of the result, to create a very wide image with inexpensive sensors without being limited a specific location as long as camera is able to detect the fingertip features of the hands.

Figure 7A:
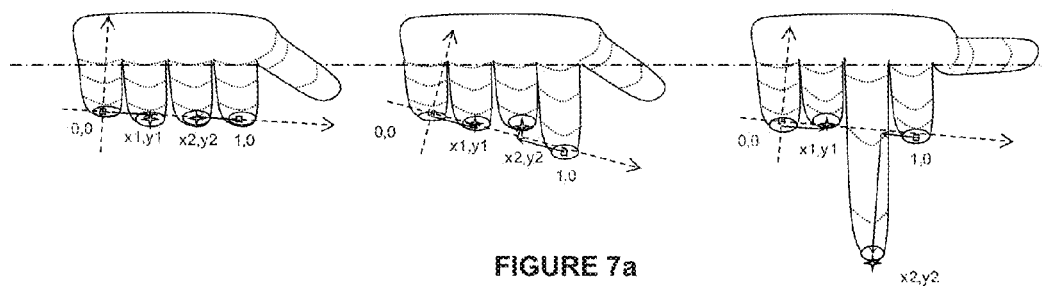
FIGS. 7a and 7b illustrate different vector signatures representing the same states.
Figure 7B:
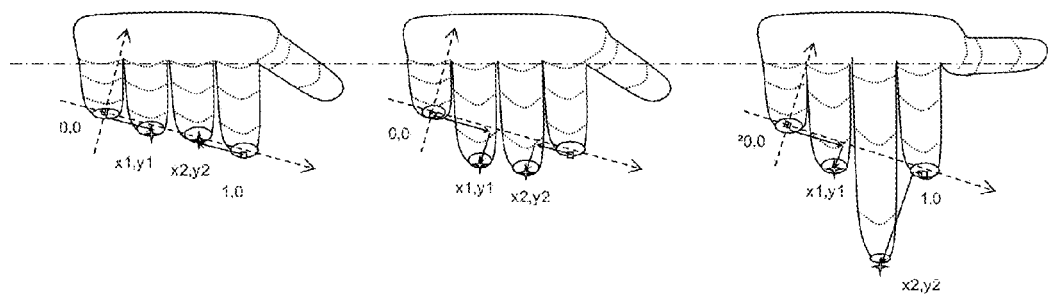

FIGS. 7a and 7b illustrate multiple vector signatures representing the same states. As shown in these figures, the vector signature of the hand in the previous state (relaxed state), the intermediate state, and the new state are different between FIGS. 7a and 7b. In an embodiment, it is possible to store multiple vector signatures of the same state in the knowledge database, in order to accurately estimate the hand gesture of the user when interfacing with the system without a physical input device.

Referring back to FIG. 1, at step 62 the method estimates the posture code from the pre-loaded information in the database to detect if a change of state occurred. As discussed above, vector signatures of different known states are stored in the knowledge database for comparison. In the present embodiments, it would suffice to have a 2d image of the last one known state, and a 2d image of the next known state in order to detect a change of state. Once detected, the change of state is mapped to a user entry/command using the information stored in the knowledge database. This allows for detecting a user entry/command with minimal computation costs. In an embodiment, images which do not show a cluster of four consecutive and non-overlapping nail patterns are eliminated before being classified. Images which show a cluster of four consecutive and non overlapping nail patterns but do not define a known state (one of: relaxed state, hit state with major down, hit state with index down, hit state with ring finger down, hit state with little finger down etc.) are classified and then eliminated. This will be described in further detail herein below with reference to FIGS. 6a and 6b.

At step 64, the method maps the change of state to a user entry. For instance, if the change of state is a hit action the user command is detected based on the finger used, the configuration of the virtual keyboard implemented in the system, and the virtual row in which the user is entering the information/commands.

Figure 5:
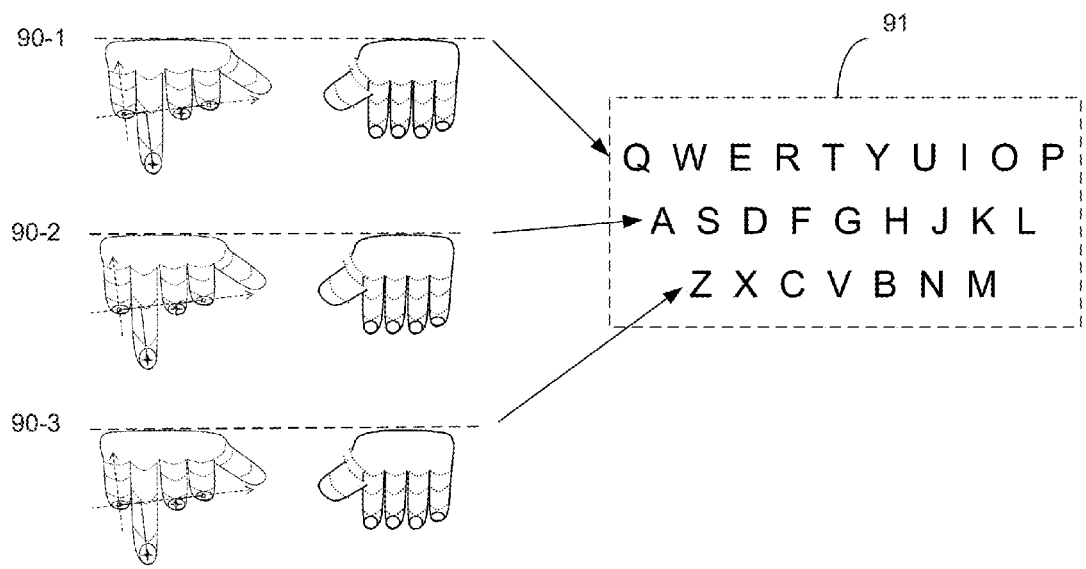
FIG. 5 illustrates an example of changing rows in the virtual keyboard by adjusting the wrist line up or down.

Several embodiments may be implemented to allow the user to change rows. In one embodiment, the user may lift/lower their hands in order to adjust the wrist line up or down, as shown in FIG. 5. In this embodiment, the system would keep track of the current position of the wrist line 90, in order to detect an upward or downward shift of the wrist line. With reference to FIG. 5, if the wrist line is at position 90-1 the system would map the user entries to the first row (QWERTYUIOP) of the virtual keyboard 91. When the user lowers their hands to position 90-3, the system would map the user entries to the third row (ZXCVBNM). Also if the user lifts their hand to position 90-2 the system switches to the middle row (ASDFGHJKL). The distance between the adjacent wrist lines e.g. 90-1 and 90-2, 90-2 and 90-3 may be preset in the system e.g. 5-10 cm, set by the user during training, adjusted during the session to account for fatigue, or any combination of the above.

In another embodiment, the system may detect the change of row based on the rotation of the hand/fingers around the axis defined by the wrist line so that a rotation of the wrist reveals a change in row. For instance, if the user is typing a character in the upper row 90-1 (FIG. 5) the hand/finger would rotate in a minimal angle, the angle increases when the finger is typing in the second row 90-2, and increases further when the finger is typing in the third row 90-2. In a second embodiment, it is also possible to use the distance between the fingertip and the wrist line. Therefore, the distance between the fingertip and the writs line axis would be maximal when typing in the first row 90-1 and decreases when typing in the lower rows.

In a further embodiment, the user may rotate their hand around the longitudinal axis defined by the arm (as illustrated in FIGS. 4a-1 to 4c-2) in order to switch between one row and another.

Other embodiments may also be implemented for the switching of rows and/or mapping of finger hit events to different characters in different rows of the keyboard.

This analysis may be done prior finger analysis but may also benefit from the information found during finger analysis, which should deliver a coarse but accurate horizon line of wrists, based on fingers base line where the geometry of it is directly recomputed for influence by the configuration of fingers detected for the hit.

In an embodiment, the system may also have a dynamic capability to adjust the KB as the interfacing session is running. This allows for handling changes like user fatigue when the fingers' movement starts to change gradually as the session proceeds due to fatigue. For example, when the fingertip no longer travels the same distance to type the same character, the system would register these changes gradually and update the KB to minimize detection errors.

In an embodiment, a keyboard interaction session may be opened by performing a certain gesture within the POV of the camera. The first entries received after the opening of the cession may be mapped to the center row 90-2 (or any other row). If the characters to be entered by the user do not exist in the center row 90-2 the user may adjust the wrist line to type in the appropriate row. Alternatively, the system may map the entries to another row by consulting the knowledge base and/or a dictionary to determine the most probable row.

In another embodiment, the user may perform a certain gesture with the fingers or hand in order for the system to understand that the user intends to enter characters from an upper or lower row. For example, the user may lift the thumbs twice to shift to an upper row, and lower the thumbs to enter characters/functions from the lower row.

The detection of the thumb is done using assisted pattern detection once the four other fingers are determined. This is a way to circumvent the difficulties related to the detection of thumb tips, as the thumb is seen sideways and its tip/nail are not always shown/detectable. In an embodiment, detection of the thumb is done using a series of possible positions due to the limited movement capability associated with the thumb. Once found, the detection of sequential command keys such as CTRL or ALT can be done. In a preferred embodiment, this approach may be used to allow for a sequential hit then relax actions, keeping the hit state of a command key active until either a letter is hit or a specific key or position of thumbs is achieved to escape from the sequence.

Referring back to FIG. 1, when the user command is detected from a change between known states, the user command is sent to the processor for execution at step 66. Execution of the command may include displaying a character on the screen or performing a certain function internally without displaying additional characters on the screen.

In an embodiment, frames which define no state are eliminated. Frames having less than four fingers are eliminated.

Detection of a State from a 2D Image

As discussed above, the present embodiments detect a user entry based on a detection of states. Therefore, a change of state between two known states taken from two 2D images is sufficient to determine that the user intends to hit a key e.g. when the system is analyzing only two stills images, one of hand in relax position and the other being one with a definitive posture of a fingers hit position e.g. FIGS. 3a-1 and 3b-1, or one in a certain finger hit position and the other in another finger hit position such as in FIGS. 3b-1 and 3c-1 etc. These scenarios may happen if the camera is slow and/or the finger motion of the user is very quick.

In most cases, however, various intermediate states exist between the previous state and the new state, which require analysis and rejection. The principle being that a hit is defined by a change between 2 known states defined in two different frames/images. However, in a feed of images these two states will be separated by many intermediate states in which the hand is caught by the camera while performing the transition movement between a known state and the other. These intermediate states are frequently of an undetermined nature, wherein the system enters in a zone of uncertainty as to what the next state is going to be. It is then necessary to establish rules for eliminating these states. The third kind of states is then defined as being the "transitional state" which the KB characterizes by a low probability revealing intuitively a far distance of the 4D point from the leaned plausible state as will be described herein below.

In an embodiment, the system uses a hysteresis based compensation of probabilities comparison of two or more probabilities. The probability of each state (the values outcome of the KB) are used and compared by groups, a group being made of the state of a single finger, the other group being the normalized state of all others excluding this one.

Figure 6A:
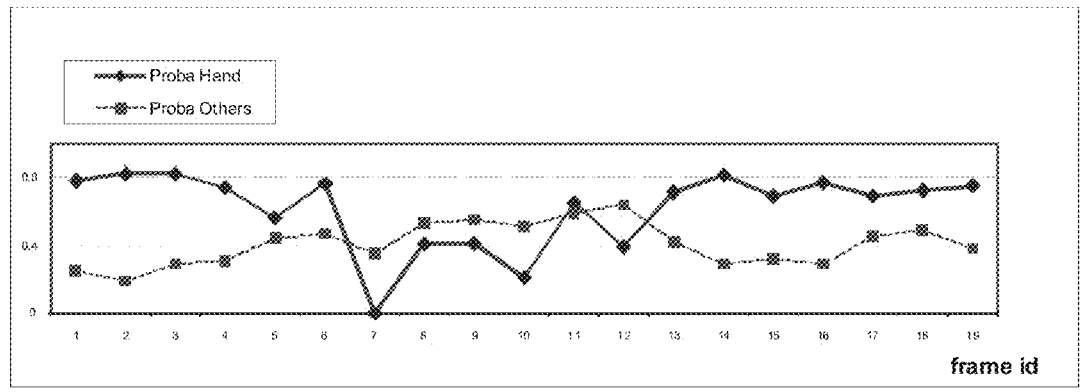
FIG. 6a is a graph illustrating the probability as measured across a window set of 20 frames, for a movement going from relax up to Index down.
Figure 6A:
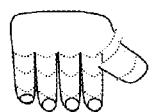
Figure 6A:
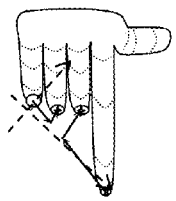
Figure 6B:
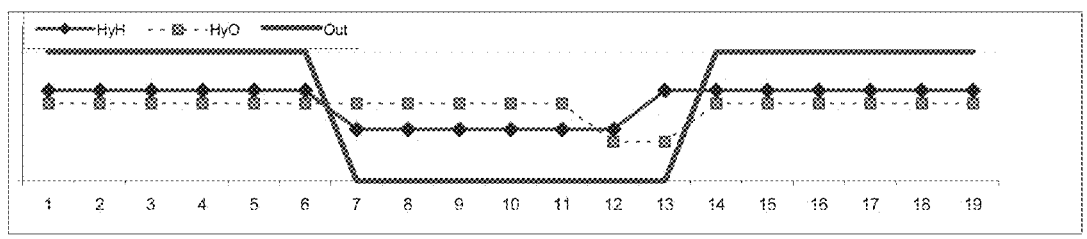
Figure 6B:
Figure 6B:
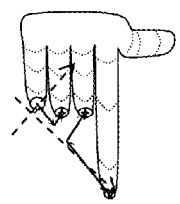

FIG. 6a is a graph illustrating the probability as measured across a window set of 20 frames, for a movement going from relax up to Index down. FIG. 6b is a graph illustrating a normalized version of the probabilities illustrated in the graph of FIG. 6a, along with a normalized output defining the confidence of a known state. In the present embodiment, the assertion of success is done when there is a high enough degree of confidence that a vector signature of a hand matches a vector signature stored in the KB (knowledge base).

When a movement has started it is very unlikely that next state is the same as the previous one unless the user changes their mind after beginning to make a certain move e.g. if the hand is in a relaxed position (FIG. 3a-1), and the user lowers the index and retracts it before passing a certain threshold. This happens as jogs of hand and must not be considered or interpreted as a change of states.

In one embodiment, the system compares the probability of a certain state against a weighted function of all the other probabilities of all other states using a hysteresis method to compare this difference to the previous difference in the previous frame. When the probability compensated by hysteresis defines a crossing point with the other probabilities, the system enters in a new state which is either an unknown/intermediate state or a new known state. If the probably in question decreases below all others probabilities after the crossing point, the frames would define an unknown state e.g. frames 7 to 13 of FIGS. 6a & 6b. These frames will be discarded. By contrast, if the probability in question increases above all others probabilities, the frames would define a new state which is a known state e.g. Frames 14 to 19.

In an embodiment, a threshold of probability of states is defined as a level under which the posture of the hand detected in the frame being analyzed no longer reveals the same state. In an embodiment, the threshold is not set as a fixed value, but rather as a dynamic function of comparison comparing the probability of a possible state versus the relative probabilities of all other plausible states. A change of state may be confirmed at the crossing of these two 2 groups of probabilities. This may be understood as a contextual dynamic threshold under which the state can be declared as undermined (unknown). Therefore, when the two probability groups reach a similar value for the first time (after the new state is declared), they define a crossing point that makes the system enter an undetermined state (transition state e.g. frames 7 to 13 of FIGS. 6a & 6b). The system remains in the unknown state until the occurrence of a further probability crossing point revealing the existence of a state of higher probability e.g. crossing point at frame 14. Following the second crossing point, the system sets the state associated with the higher probability as the effective new known state.

In an embodiment, the system may evaluate the motion of the hand over one or two frames after the second crossing point. In the example of FIGS. 6a and 6b, the second crossing point occurs at frame 12, but the new known state is declared active at frame 14. The method discussed above may be performed using a hysteresis method over the previous one or two frames (dynamically depending upon absolute quality criteria) to confirm that the crossing point defines a real trend. The state is kept active until a maximum is reached or until the probability becomes undetermined again while the user is making another motion.

In an embodiment, analysis of a state is done by measuring the position in 4D of a configuration of tips to every idealized position. The measuring is optimized in the 4D space but can be assimilated as simply as an Euclidean distance. The distances measured are then used and compared to themselves as explained to determine the most probable position.

In a non-limiting example of implementation, the KB may contain a series of "paths" revealing the idealized configuration of fingers for each movement (succession of ideal arrangements of fingertips during a movement). The paths do not represent the real trajectory of the fingers in the sense of a dynamic movement, but a 4D trajectory revealing the best expected arrangement of fingers type along every movement of the fingers for a certain state in a 4D environment. The KB calculates the distance between the arrangement of fingertips and each path. The smaller the distance the higher is the probability associated with the state. For example, if the KB is seen as a cube (it's a "hypercube") then each arrangement of fingertips submitted has a coordinate point within this cube. Ideally, the coordinate point is close to the trajectory of a plausible state. As all the states of interest (combination of fingers for hit) are defined with their preferred paths of mutation, the coordinate point is surrounded by all the reference paths obtained from samples learned and/or pre-learned. This allows for calculating the distance between the coordinate point and every other path, simply using the criteria of nearest distance. Each path has a marker indicating the fingers posture it represents. So a search of the four nearest paths to a coordinate point gives four probability values, each probability representing the likelihood that the coordinate point belongs to one of the four expected positions. The shortest distance to a certain path indicates that the finger posture represented by that path is the right posture (the one with the highest probability). The other three probabilities could be used to meter how indeterminate the state is. In other words, the KB outputs the shortest distance to a reference path, and the state of this reference path (revealing the fingers posture associated).

However, it is also possible to check the distance of the submitted sample (arrangement of fingertips made of rationally organized 4 fingers tips) to every point of every path in the galaxy of points of the KB Hypercube, in a non-limiting example of implementation. This will then give the likelihood of the tips arrangement to every reference point to test every posture, the most likely posture as well as the less likely one. A scan may be done to establish the distance to nearly every point of every posture. The smallest value for each posture being the probability that the tips arrangement is in the state of a specific fingers tips posture.

A hypothetical example is provided below to illustrate the 4D concept in a 2D model. It should be understood, however, that the example is impractical and is only provided for the sake of facilitating the understanding of the 4D concept discussed above which cannot be illustrated to the reader.

Figure 12:
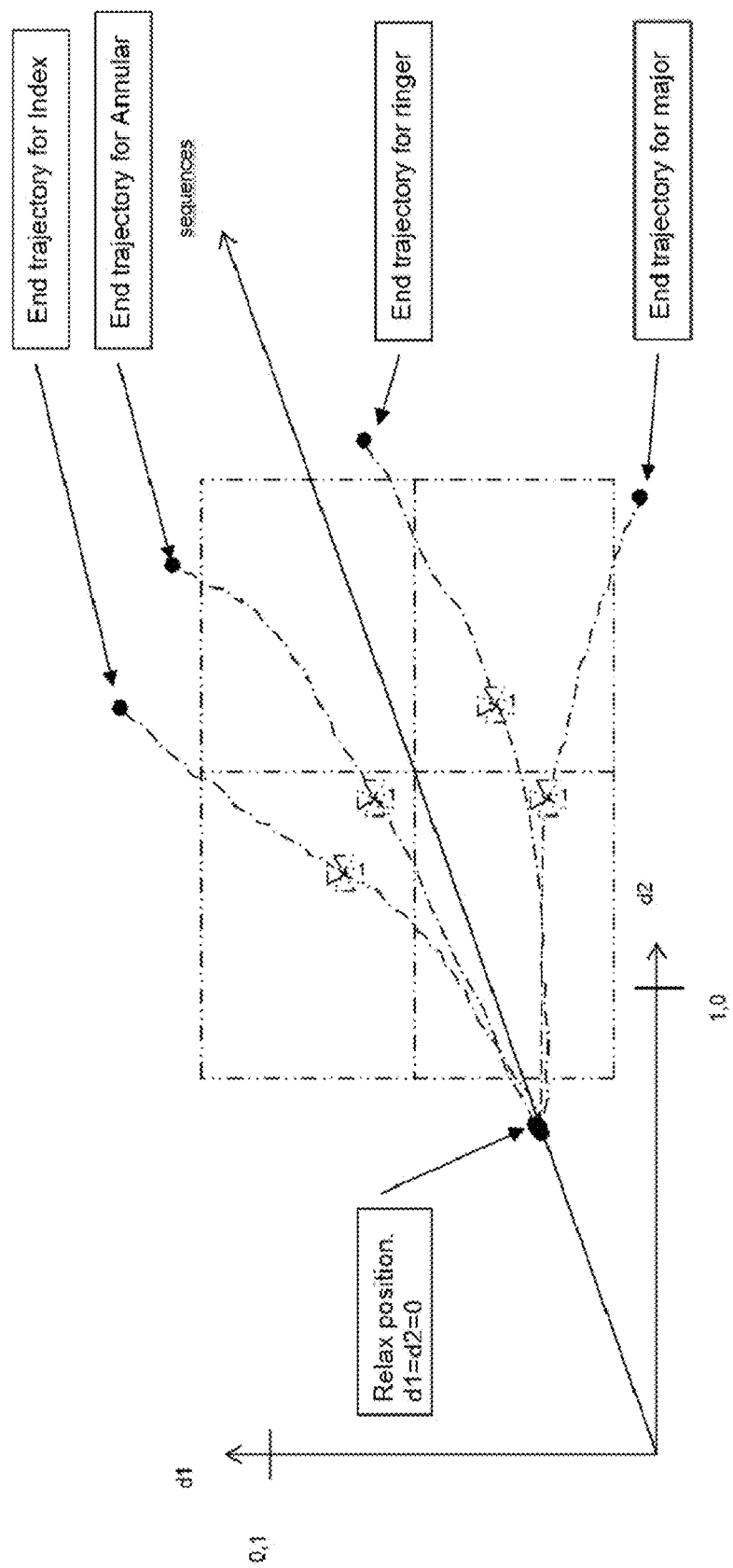
FIG. 12 illustrates the ideal 2d paths for each finger starting from a relaxed position, in the hypothetical 2d example.
Figure 13:
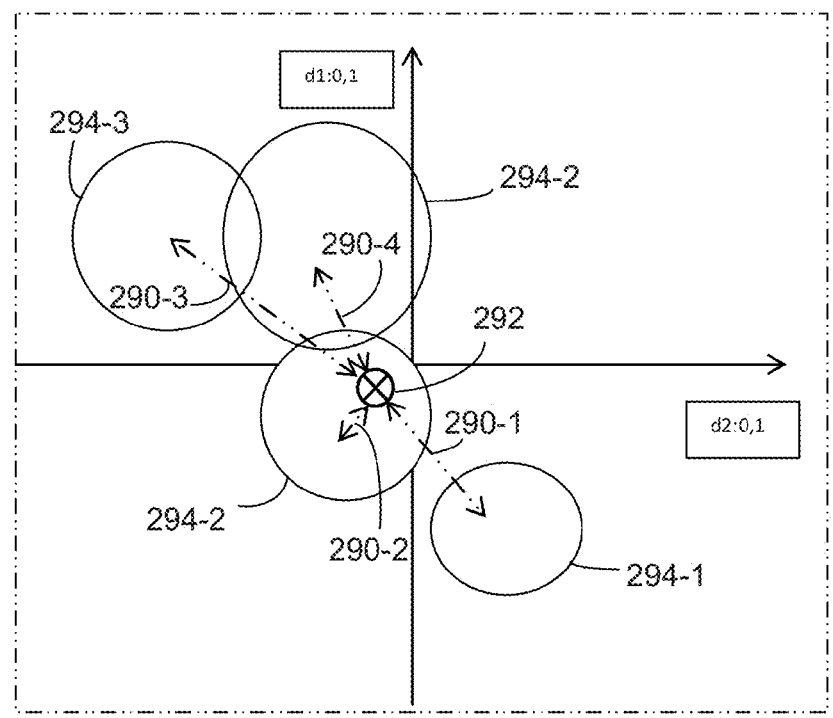
FIG. 13 illustrates the distances between a candidate position point and the ideal position points of the ideal paths, in the hypothetical 2d example.

In the hypothetical example, instead of considering the model with 4 vectors for four fingers, we reduce the number of fingers to an impractical model involving only 2 values (for two fingers) made of distance of center fingers to the base line defined by the tips of the annular and index fingers, for illustration purposes. FIGS. 11a-1 to 11d-2 represent the different hand postures with their respective vectors signatures. FIG. 12 illustrates the ideal 2d paths for each finger starting from a relaxed position where d1=d2=0. FIG. 13 illustrates the distances 290-1 to 290-4 between a candidate position point 292 and the ideal position points of the ideal paths. As indicated above, the smallest distance between a certain point and a certain path indicates the highest probability that the finger posture associated with that point represents the finger hit associated with that path. Also illustrated in FIG. 13 are tunnels of acceptable values for the paths of each finger. In the example of FIG. 13, the tunnels 294 are represented by circles.

The ideal path approach is suited when a movement is known to be regular and have a best description. This is applicable in case of higher constraint to put on user movement, the penalty being more rejection in case of fatigue or unusual user behavior.

Therefore, in another embodiment, the ideal trajectory is not considered as having a virtual existence, but rather consideration are given to every point acquired during the learning phase. This avoids using a concept that requires establishing a main trajectory where any method would de-facto ponderate the measure done during the learning phase. Instead, a probabilistic method is used, involving enumeration of surrounding samples, which allows to reflect more accurately some peculiarities of users movement and then will not give an abnormal privilege to a position in the 4D space that may not represent the center of a best shape for analysis of distances between samples and classes, but not account addition of the cluster of plausible position.

This is more accurate and accounts for odd shape like for example a cluster of learned samples that aggregate following a toroidal pattern. In which case, the center is not an accurate representation position of a plausible state.

The mechanism involves the same learning phase, then each sample learned, is kept in the 4D space. During the run time, the submitted sample is then considered as the center of a volume in the 4D space.

Then all existing samples already learned, are accounted for when they are inside this volume. Then, for each class of detection to be considered; Index down, major down ringer down, annular down, the enumerated samples are divided by the total of all samples. This creates a probability that the sample belong to a class. The higher is the better, but even the highest value can exhibit a lack of confidence. In an embodiment, a threshold is applied to avoid considering abnormality. As the volume increases the probability density increases, but also the pollution/noise from other class that would account sample in the volume, may lead to a wrong assertion in case the volume is close to a dense cluster of a wrong class.

In an embodiment the size of the volume to consider may be adjusted during the learning phase. For example, for each class it is possible to determine the smallest values that have the highest density using a dynamic programming method in order to size each threshold of acceptance and the volume of enumeration.

In an embodiment, the minimal and maximal possible size of these classification volumes are arbitrary chosen and determined during implementation.

Each dimension may have its own heterogeneity this is accounted for by performing a processing on the learned set using for example a lookup table with an histogram based smoothing or a Kohonen NN optimizing the coordinates to increase agglomeration of cluster and expanding space between each cluster.

In another embodiment, determination of the hit is performed by analyzing all combinations of two probabilities at a time searching for a double crossing of probabilities with a change of derivatives while the probabilities exist within a certain a corridor of confidence to eliminate noise/jitter. An example is illustrated in FIGS. 14a and 14b.

Figure 14A:
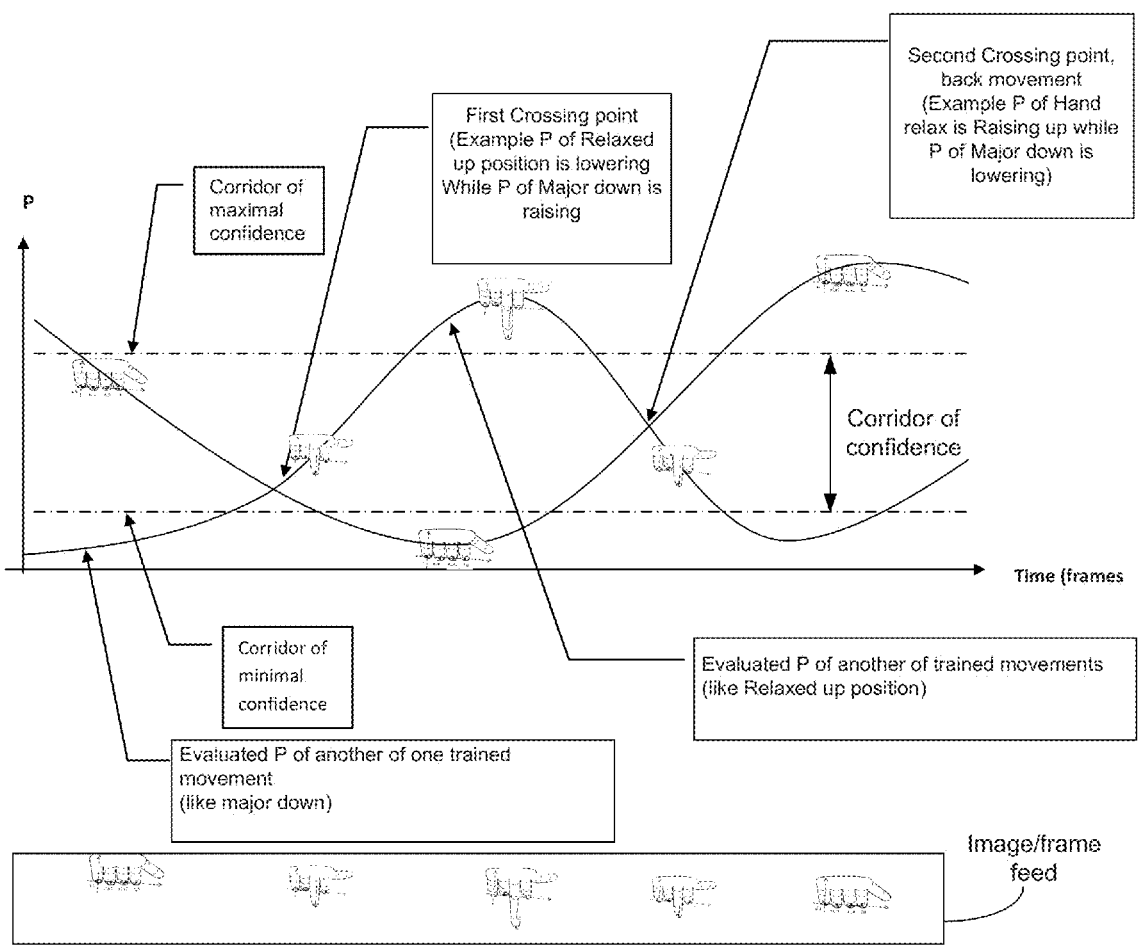
FIG. 14a illustrates a two by two comparison between the probabilities of major down movement and the relaxed up movement for a given frame feed representing a relaxed to major down followed by a return to relaxed up position.
Figure 14B:
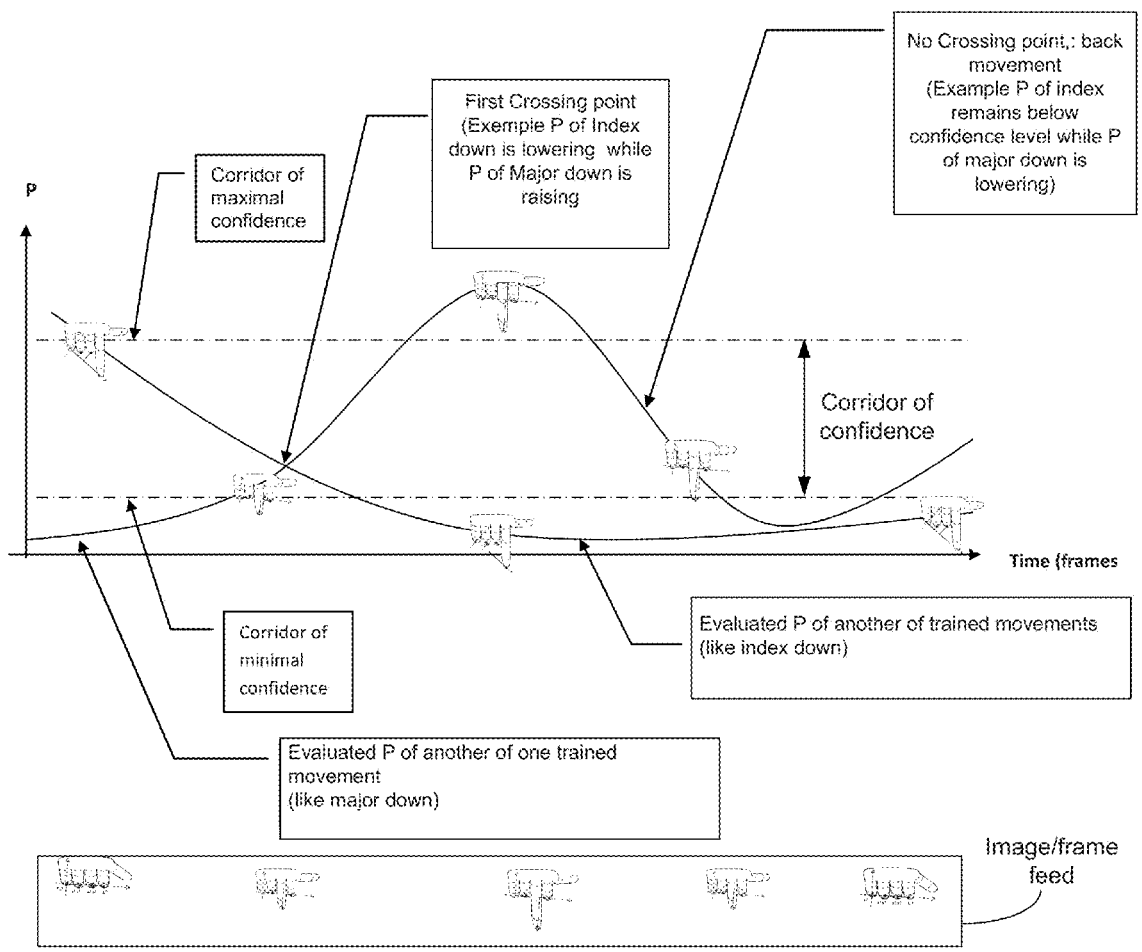
FIG. 14b illustrates a two by two comparison between the probabilities of index down and major down movement for a given frame feed representing a relaxed to major down followed by a return to relaxed up position.

FIG. 14a illustrates a two by two comparison between the probabilities of major down movement and the relaxed up movement for a given frame feed representing a relaxed to major down followed by a return to relaxed up position, while FIG. 14b illustrates a two by two comparison between the probabilities of index down and major down movement for a given frame feed representing a relaxed to major down followed by a return to relaxed up position.

As shown in FIG. 14a, a double crossing of probabilities was detected which may be used as indication that a hit was intended by the user. This may be confirmed after the second crossing of probabilities. By contrast, in FIG. 14b which illustrates the probabilities for the same image feed, there was no second crossing of probabilities for index down. Accordingly, the system would not consider this combination of probabilities as being of any relevance.

Various methods may be used to speed up the computation in these embodiments. In an embodiment, the computation may be nearly instantaneous by providing a lookup table in the KB. Furthermore, the number of points to consider is not high enough to complicate the computation. For example a one second gesture gives 25 samples. This makes 100 samples or references paths for the four fingers.

The learning process can continuously enrich the KB. But it can be seen as creating a cluster of reference paths around the ideal/preferred reference path, so that the organization of the KB can be done such way that computation for each kind of gesture can stop as soon as one is found for the looked at gesture which is considered as the closest for this gesture or close enough. This does not increase the number of tests to do by much. Various methods of indexed search allow for very fast computation of theses probabilities.

In an embodiment, the analysis starts by finding the most likely arrangement. Subsequently, the KB analysis is done in 2 internal phases: Finding the distance to the closest path, and performing an organized scan of all surrounding reference paths, starting from the closest path. The analysis provides one main result: the value (distance) and kind (finger hit e.g. major, annular, etc.). The analysis may also provide three other results, each result being associated with the other finger postures. The four results can be used to create the four set of probabilities that can be arranged as groups and be used as explained above for state transition detection.

Training

The system may be preloaded with vector signatures and intelligence data for processing images and detecting hit events. In an embodiment, the system may be trained by the user to enhance its performance. The training may be an assisted training, and/or an un-assisted training (aka dynamic training).

In the assisted training, the user may be asked to simulate a hit of each finger, from left to right then from right to left (or vice versa). The user may be asked to repeat the exercise to average the best position and account for the jogs. Between each pass, the user may be required to keep a standstill position for at least 500 ms. During this time, jogs are continuously monitored to assert the best clamping offset and table for the Y-axis. In an embodiment, a 10% scale down is taken into account for overshoot detection at run time. That will also trigger a mechanism to re-centre the considered set of postures for the expected states of aspect for this new extreme. In one embodiment, the reduction of precision needed to keep a KB of reasonable size is assisted by a Neural Network that optimize the decimation in scaling for each value of the 4D vector of sample. In an embodiment, the trajectories are recorded at maximum precision, and then 4 Kohonen NN Quantization tables are computed, based on distribution of trajectory position and weighted also by the distance to hit.

It should be noted that these methods do not measure or depend on the speed of the finger but rather on the number of samples.

In the unassisted training, the system may be trained dynamically as it runs. This type of training is hidden to the user in the sense that it is done behind the scene without asking the user to type or perform other actions. One of the main advantages of dynamic training, is that the system can account for user fatigue which gradually affects the fingers behavior during typing e.g. with fatigue unused fingers are lower than in the normal relaxed up state, and the fingertip of the lowered finger (used for hitting a virtual key) does not extend all the way down to the position reached at the beginning of the session etc.

Opening and Closing a Session

As discussed above, the user may open a keyboard interaction session by performing a certain gesture within the POV of the camera.

However, other opening-session mechanisms are also possible which do not require the detection of a predefined gesture. For example, experiments show that the detection of two hands in a "relax" state which remain steady for a couple of frames is a very unusual event, which does not happen arbitrarily. In an embodiment, this concept may be used to establish the opening of a session without requiring the user to move the hands in a pre-defined manner. In an embodiment, a session is opened upon detection of the nails in a "relaxed" position and the sudden appearance of the nails, if the appearance is steady over a couple of frames. This mechanism allows for more reliability once the user registers their nails using the learning mechanism.

If, without intention, the user places their fingers in opening session position, the classifier would reject the gesture especially if the finger of only one hand appears. An Avatar of keyboard could be displayed or other visual/audio indications could be provided to warn the user.

To close the session, the user may hide their fingers for some time. The user may pause the session to continue at a later time and/or may adjust the waiting time according to their need.

Other embodiments are also possible for closing the cession such as performing a certain gesture.

Detection of Fingers

Figure 8:
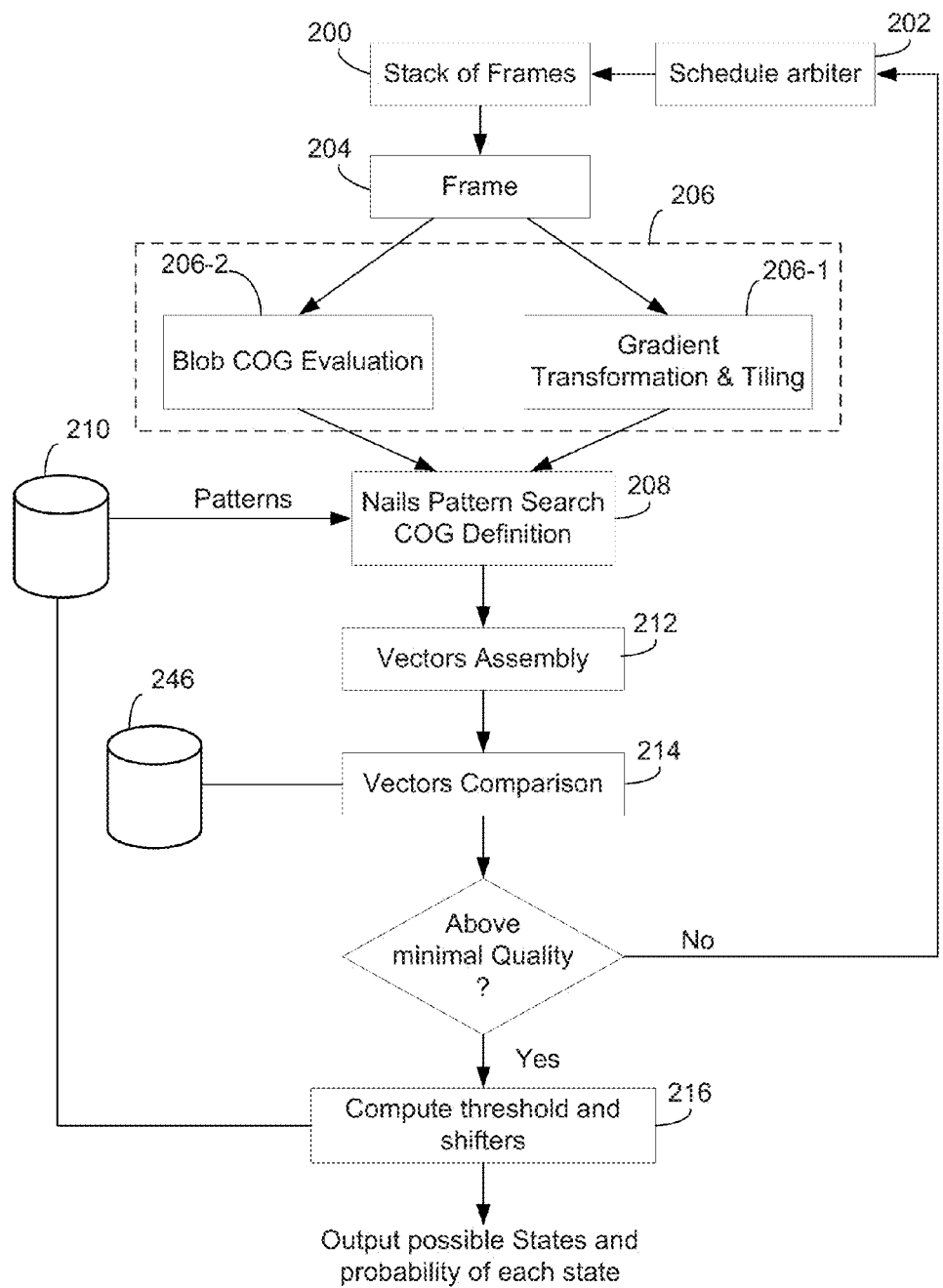
FIG. 8 is a flowchart of the finger detection process, in accordance with an embodiment.

FIG. 8 is a flowchart of a method for detecting fingers using a finger detection module in accordance with the present embodiments.

A series of frames 200 is received from the camera. The frames are stacked in memory. Using a schedule arbiter 202, the frames are passed one frame at a time for analysis and processing. The frame 204 is then sent to an image processing module 206. In an embodiment, each image is subject to two different image pre-processing steps performed by two different modules. Namely, a gradient transformation and tiling module 206-1 and a blob COG evaluation module 206-2.

The Gradient transformation and tiling module 206-1 performs the image transformation and pattern searching/matching. The pattern matching may be done using a SSD method (Sum of Square Difference (the basic Euclidean norm)) but on a very peculiar transformation that purposely neutralizes luminance change amplifying the dynamic of the image gradient for medium frequencies, and keeping information from low as well as very high. Other methods may be used such as the Mahalanobis distance.

The tiling module 206-1 may be responsible for:

Image preparation: conversion to luminance, creation of a scaled version at 25%, hereafter called 4×4 cell;

Computation of a wide local average of the luminance on the 4×4 cell using an averaging of 4×4 pixels using an 8×8 grid of these squares;

Computation of a relative gradient, each 4×4 cell computation of a plane of local difference of luminance difference of luminance using a clamping rule made of: min ($\Sigma$i (ai2−bi2), $\Sigma$(ai2+bi2)) where 'a' is original image and 'b' is averaged image;

Computation of the variance of the original image;

For each pixel, dividing the variance by the normalized gradient if not null. If null then division is not done and this area is flagged to be filled with the average of the resulting non flagged area.

The other pre-processing step is performed at the blob detection module 206-2. The blob detection is based on previous hit detection or triggering movement that allows to extract a region of interest. Blob analysis detects a general Center Of Gravity (COG) analysis to assert where the estimated hands are. It is used as a non-mandatory feature that will participate to the final probability assertion. Blob detection may use a Starr method on the medium frequency filtering of the image.

Each finger is differentiable from its background generally by the nail and shape of its tip. The processed image exhibits a pattern matching of a pattern through simple comparison method that allows for less stringent and simple metrics for pattern matching. A nails pattern search module 208 searches the processed images output from the image processor 206 to detect the nails of the hand and define the COG of the nails. The module 208 may obtain the nails pattern from a database 210 connected to the system. The database 210 may be pre loaded as well as learned or modified at run time, and may include tip patterns, scaling factors, Neural Network (NN) information. The search may be done with a shift factor that depends upon the size of the pattern rectangle but can very well be only a single of 1 pixels (or Frame grids units). The search for tips pattern can use many other methods including convolution networks, as this process is a pixels based pattern search.

Following the pattern matching, a COG is determined for each matching nail (rectangle) using weight made of differences between original and searched patterns. Intersecting pattern areas lead to a COG reduction. In an embodiment, it is possible to use a proximity factor versus quality of each COG, also involving dynamic factor like hand size of previous frame if available. The suggested reduction may be done by elimination of weaker, as opposed to averaging of position. However in cases of multiple take-up with focal information, any overlaying COG from different take-up can consolidate a position using an averaging weighed by the relative quality of pattern matching.

Once the nails are detected and their COGs are defined, the vectors are assembled in a vector assembly module 212. The classification phase requires a set of only four tips. The tips need to be assembled in a relevant manner and enumeration count computationally acceptable for submission to the classifier. Even if the classifications phase is extremely fast because it is indexation based, it is an important part of the process to eliminate spurious features while enumerating every case of four features to avoid missing the correct ones. Depending upon the number of tips found in the process, an eventual additional step computes a maximum of 5 COG of tips COGs, to assist fast geometrical selection of all plausible set of 4 coordinates. In an embodiment, tips located 50% above any COG or 200% below any COG are eliminated. Sorting of tips position allows for assembling a set of four values for submission to the "KB". Negative offset or overshoot may be clamped respectively to 0 and 1, and may also be stored to allow readjustment of parameters for next frame as part of the self-adjustment mechanism.

In a non-limiting example of implementation, X values do not go beyond [0-1]. The Y value is artificially normalized to [0-1], as an indication that the typical range is 1.5*X. However the real value is based on bounding data found during training. At run time, it may happen that the Y values go beyond the boundaries set in the Knowledge-Base. Many other methods can be used including the re-homogenization of coordinates in the "KB" Space.

The vectors assembled at the vector assembly module are then tested at the vectors comparison module 214. The comparison module 214 compares the vectors output from the vector assembly module 212 to a table of pre-stored vectors in the KB 246. This table is loaded during the training phase with a cloud of code around each trained hit sequence. The indexation outcome gives information allowing comparing current position with trained sequences, to determine whether the vector represents a hit or whether it should be discarded.

In an embodiment, the "KB" delivers the following information:

A "Code" indicating which final mutation is relevant for this hit gesture,

A "Time Code" characterizing the sequence expected for such mutation for a hit movement.

A "Distance to Hit" to the trained hit position allowing to check proximity to a hit. This value is the class probability in case of the embodiment using probability space enumeration.

A "Quality" factor revealing how close the gesture is to the ideal trajectory. Only 4 states are needed.

On trajectory (within 10%)

Within 50%

Within tolerance

Out of limit of excursion sensible for this gesture.

Subsequently, each value from COG which is computed as sub-pixel resolution is first scaled between [0,512]. The values are is then presented to a set of reduction tables 9 bits-in 4 bits-out which are loaded with a Kohonen Network, which allow optimal quantization of values found during the training phase.

Other methods of hashing and KB search may also be used, but the one used in the present embodiment is able to segment the content of the KB with time.

Referring back to the vectors comparison module 214, if the vector assembly compared at 214 is above the minimum quality (requirement), the system computes the threshold and shifters at a threshold and shifters computing module 216 and reports these to the database 210 for updating it. The threshold and shifters include movement models, and run-time adjustments which are used for continuously training the database 210 as the session proceeds. If the vector assembly compared is not above the minimum quality, an indication is sent to the schedule arbiter 202 to send the next frame for processing.

The finger detection module outputs the possible states and the probability of each state.

In an embodiment, the pattern detection can be extended to detect a group of nails like two contiguous fingers at step 208. An example is illustrated in FIGS. 15a-1 to 15c-2. FIGS. 15a-1 to 15C-2 illustrates different hand states and their corresponding vector signatures using the group of fingers approach, as opposed to the method illustrated in FIGS. 3a-1 to 3c-2. In the present example, the vector signature uses the same approach to construct a signature from the two values however these two values will be used at step 214 in a comparison to a Knowledge based now specific to each of the known groups of two fingers. The classification then used only two dimensions but with a very limited cluster of plausible values as it only applies to the additional fingers. The recognized group then assumes the selectivity that compensates for this fusion of features dimension. Therefore, the same evaluation mechanism can be used to generate a probability and quality factor for the gesture, as in the previous embodiment.

This specific cases can be asserting a gesture and run standalone for delivering a value in itself, but it may also be chosen to run in parallel to the individual nail pattern recognition to assert a compounded value comforted from the two same methods applied to two different pattern cases.

The augmented quality asserts a better result and allows either a direct determination form this group set or may be used as a discriminating factor if compounded with the 4d approach.

Variation exists where the combination of recognition of single and dual nail or even more can lead to build a n*D knowledge base where the enumeration principle as described above allow still determining a probable outcome.

Another embodiment can be made using a 6D knowledge base which must use the probability enumeration method of local volume to allow a safer determination in a 6D space where many cases may be missing as pattern detection may fail more frequently. This creates many holes zone in the 6D space. But the probability method used will still deliver a safe assertion. However it reduces to a two value set augmented of the valuable information that the two values should be interpreted in the context of a specific group of nails.

Figure 9:
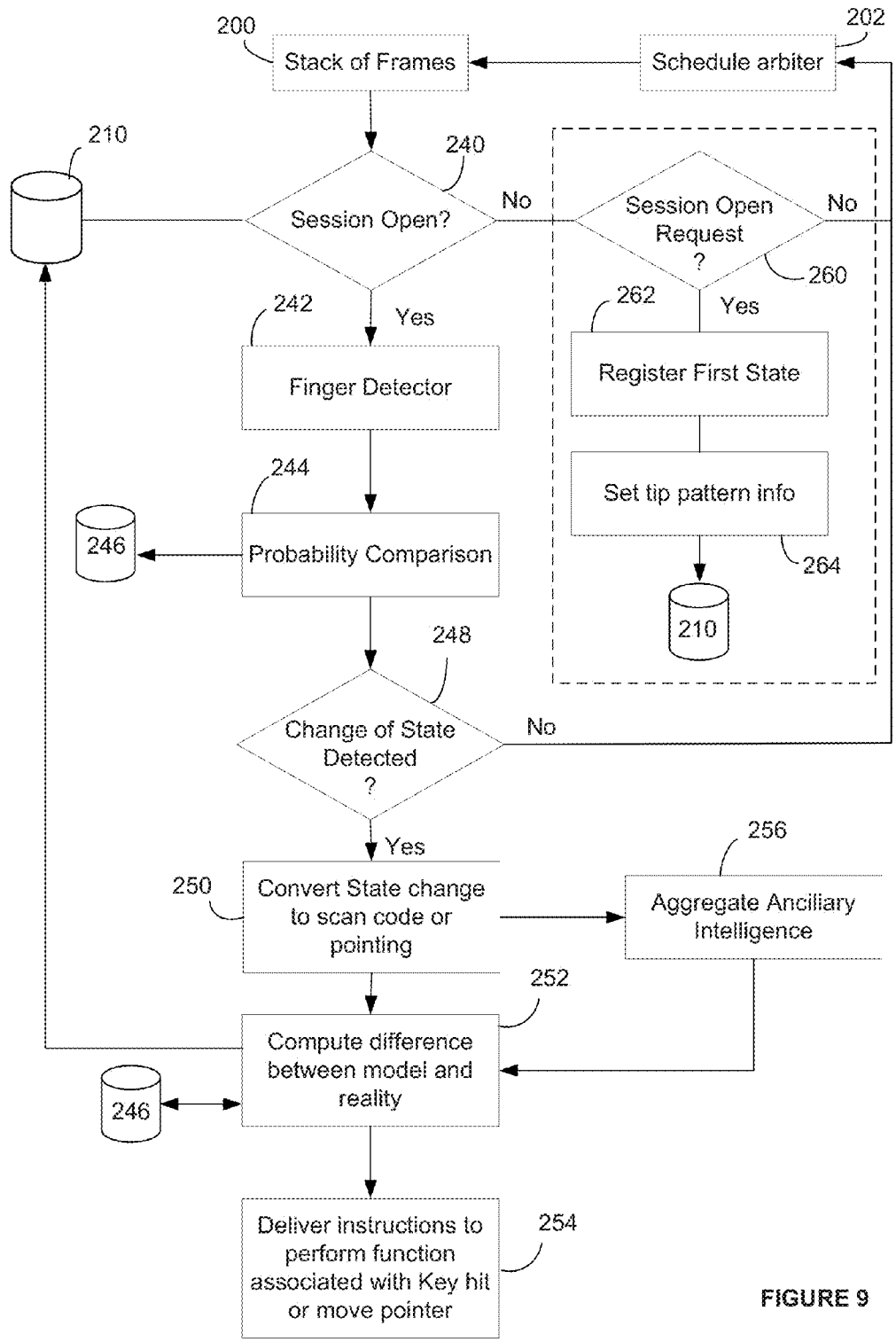
FIG. 9 is flowchart of the overall process of interfacing with a computer using a camera, in accordance with an embodiment.

FIG. 9 is flowchart of the overall process of interfacing with a computer using a camera, in accordance with an embodiment.

As described above, a series of frames 200 is received from the camera. The frames are stacked in memory. Using a schedule arbiter 202, the frames are passed one frame at a time for analysis and processing. At step 240, the system verifies whether a session is open or not. If a session is open the process proceeds to step 242 to detect the fingers and obtain the vector assembly (vector signature) defining a plausible state as discussed in connection with FIG. 8. The vector assembly is then subject to a probability comparison as discussed above. At step 244 the system weighs the probability of each state versus the added probability of all other states using hysteresis method using the knowledge stored in a knowledge base (KB) 246, until a crossing point occurs between the probabilities as described in detail in connection with FIGS. 6a and 6b.

If a change of state is detected at step 248, the system may proceed to step 250 to convert the change of state to a scan code (key hit), or pointing device movement (movement of the visual pointer using a virtual mouse). At step 252 the system computes the difference between the models pre-stored in the KB and the reality as seen in the user's motion, and updates the KB 246 continuously as the session is running. For example, the system may adjust the finger positions in the KB to take fatigue into consideration. In an embodiment, step 252 is the major module in charge of reasserting what could be done better (Scaling factor as well as KB best positions).

At step 254 the system delivers instructions to perform the function associated with the key hit e.g. display a character, or to move a visual pointer (if the user is interfacing with the computer using a virtual mouse).

Optionally, the system may consult with an ancillary intelligence at step 256. Step 256 involves consulting a database 246 including a dictionary and/or information relating to one or more of language, vocabulary, grammar rules, layout of the characters in the keyboard etc. to determine the likelihood of For example, if in the previous hand motions the user was typing the word "Wago", and then enters the characters "B". Based on the proximity of the characters B and N to each other in the keyboard, the system may then determine that the user and/or the system itself had mistaken the characters "B" with "N" because the word "Wagob" does not exist in the dictionary while the word "Wagon" does.

It should be note that the order of steps 250 to 256 may vary without affecting the performance of the system.

Referring back to step 240, if a session was not open upon receipt of the new frame, the system may then proceed to step 260 to determine if the frame defines a request for opening a cession. If yes, the system may register the first state at step 262, and set the tip pattern information at step 264 in the database 246. If not, an indication may be sent to the schedule arbiter 202 to pass the next frame for processing.

Figure 10:
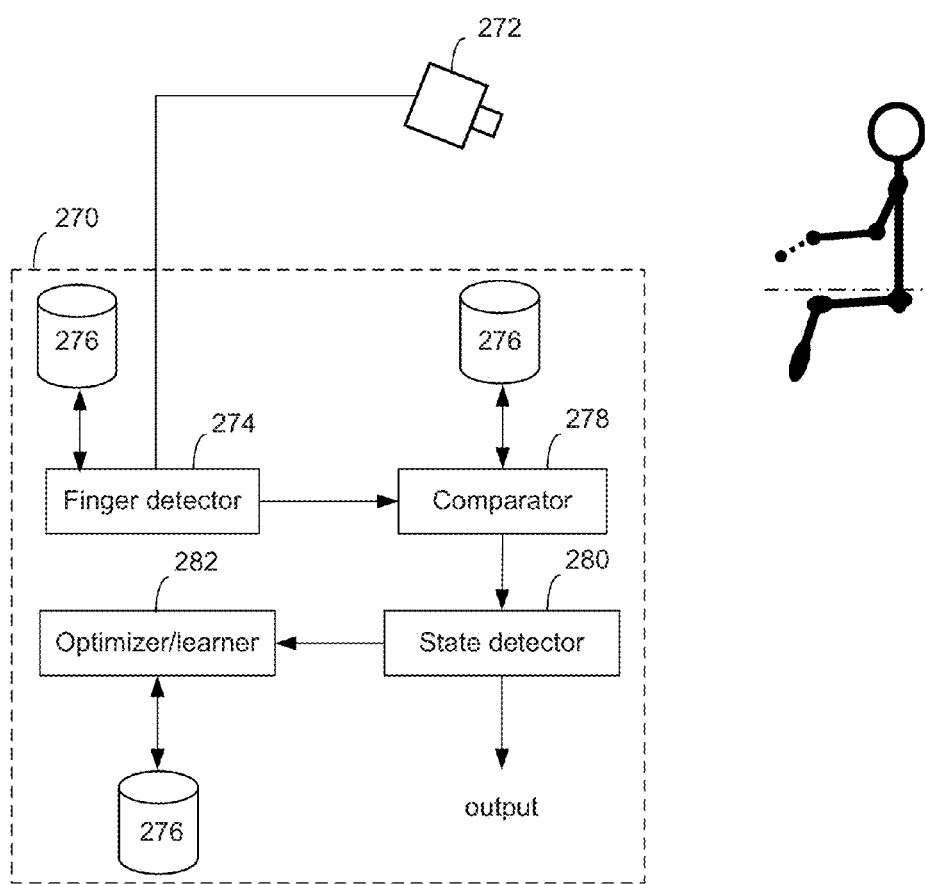
FIG. 10 is a block diagram of a system for interfacing with a computer using images representing the motion of a hand, in accordance with an embodiment.

FIG. 10 is a block diagram of a system for interfacing with a computer using images representing the motion of a hand, in accordance with an embodiment. The system 270 may be provided as a separate device that may be connected to the computer and/or a screen and may also be implemented by the computer itself as a series of instructions that may be executed by one or more processors of the computer.

The system 270 receives still images from an image feed device (camera) 272. The camera 272 may be embedded within the system 270 and may also be provided separately. In an embodiment, it is possible to include more than one camera providing images of the fingers from different angles in order to improve the system performance by aggregating multiple take-ups of the same view without introducing the stereo configuration. This embodiment is described in further detail below.

Images output from the camera 272 may be received at a finger detector 274. The finger detector 274 analyzes each image to detect the fingertips, and assembles a vector for the fingertip arrangement detected in the image based on the position of the fingertips with respect to each other. The finger detector 274 (or the comparator 276) compares the assembled vector with vectors signatures representing known states of the hand which are stored in a knowledge base KB 276. The comparison results in a determination of the possible states that the vector may represent and the probability associated with each state. The comparator 278 weighs each probability against a sum of all others using a hysteresis method in order to determine the most probable state. The comparator is operatively connected to a state detector 280. The state detector 280 keeps the current state active until a crossing point occurs between the probabilities. When a crossing point occurs, the system enters in a new known state or in an undermined state depending on whether the probability of the active state decreases on increases after the crossing point. This has been described in detail above in connection with FIGS. 10 and 11. When the new state is a new known state, the state detector 280 maps the change of state to a key hit or to a mouse movement. An optimizer/learner may be connected to the state detector to optimize the KB 276 to continuously train and update the parameters stored therein as the session is running.

It should be noted that the system shown in FIG. 10 is for illustrative purposes only. Several changes may be done to the modules illustrated in this figure and the functions associated with these modules. Additionally, the modules may be divided into further modules and may also be combined with each other without departing from the scope of the disclosure. For example, some of functions performed by the finger detector 274 may be performed by the comparator such as the weighing of different probabilities etc.

Thumbs:

When interfacing with the computer using a virtual keyboard in accordance with the present embodiments, the thumbs usually stay nearly horizontal like in an ordinary keyboard. In an embodiment, moving one or both thumbs may be understood as a signal that allows for adding additional functionality. The thumbs' movement defines three positions: relaxed (horizontal), down, and up. This also allows creating some additional gesture as backup for existing keys, as well as creating new actions. For example, it is possible to implement or duplicate one or more of the frequently used keys using the thumbs e.g. the Backspace key may have the normal placement and/or may be entered by moving the thumbs down twice, or up once etc.

Mouse:

In an embodiment, it is possible to switch from a keyboard mode to a mouse mode by tracking one hand where only one finger is visible. This may be done using same constituency analysis of sequence and focusing search seed to a limited area around the finger. A dwell time allows for switching mode e.g. 500 ms-second duration. Apparition and disappearance of at least a single finger emulates a click. Appearance is not enough as it could be detected as a sign of being back in keyboard mode. Right click emulation is done by the appearance and disappearance of another finger immediately close to the first fingers. In an embodiment, the system associates the index finger with the left click of the mouse and the major finger with the right click.

Qualifier Keys

Generally, usage of a keyboard involves the use of qualifier keys such as shift, Alt or Ctrl, and others. When interfacing with the computer using a virtual keyboard, it is difficult to have the user press two keys simultaneously in space without support. In an embodiment, it is possible to activate the qualifier key, press the necessary keys, and then deactivate the qualifier key. In another embodiment, it is possible to implement, a special escape button for qualifier keys ("qualscape") that turns off all activated qualifier keys. For example, if the user types Crtl+Alt to perform a function such as accessing the task manager (Crtl+Alt+Delete), or to print the screen (Crtl+Alt+PrintScreen), the user may press the "qualscape" button to deactivate all active qualifier keys. The "qualscape" key may be advantageously considered as a specific position of the thumbs, like one raised, and the other one lowered or any other combination.

Deletion Keys:

The deletion of wrong characters is an important issue to deal with especially when using a virtual interface where the typing errors are estimated to be higher than with a normal keyboard. Therefore, the Backspace key and to a lesser extend the Left arrow+Delete key will have an accrued usage.

In an embodiment, usage of these keys induces a learning mechanism in order to reevaluate the detector setup. For example, when the Backspace key is hit, the previous character digest is stored until a next key is hit. The geographical location of the new hit will then decide if it was a detection error by checking if the new character falls within the immediate radius of the deleted character. The averaged position may then be stored and a reference counter increased which when reaching a certain threshold may be used to update/adjust the Knowledge-Base information of the trained set.

Although in the present embodiments, the hand movement is detected by its state, the described method may be assimilating the hit position as being relative to a certain grid, in accordance with an embodiment. For example, it is possible to perform a global distortion of the grid hit to match decreased usage of the deletion. If this fails, it is possible to widen the relative distance between virtual keys in this area, forcing user to make wider moves. Therefore, it can be said that using scaling factor used for vector arrangement, the amplitude of displacement and movement can be taken into account and the user may be forced to make wider movements to trigger an action. In an embodiment the process of grid distortion is bound to ⅔ of fingers size and to ⅝ of the original keyboard size to avoid unreasonable growth.

These distortions do not exist as a geometrical adjustment, but as a change in multiplier & offsets applied before submitting a 4D vector to the KB.

Use of Color:

While the camera is essentially tracking luminance, another embodiment may obtain additional feature discrimination by checking that hue change between high and hit position match hue change form train set. The suggested place for this additional enrichment is during the vectors assembly phases, releasing constraint on the pattern matcher to create some room for a benefit of this additional factor. In the present embodiment, the system may evaluate the coherency of color between the different tips. This allows for using the system in various lighting conditions as well as when gloves are worn e.g. surgical gloves.

Size of the Knowledge Base "KB":

The present embodiments may be implemented with 24 bits as 4×6 bits index, with 24 bits of value for data information.

A different embodiment may consider the Y-axis being of better interest the table entry size can be easily increased to 26 bits as 6+7+7+6 bits and still acceptable in footprint. Other methods of hashing and "KB" search can be used, but the one used in the present embodiment is also able to segment the content of the "KB" with time to allow even smaller memory to be used, loading only the relevant frame sequence combination. At 30 frames/sec and a training done in not more than four sec/hit the uncertainty regarding the best matching frame is the +8 and −8 of time sequence of previous frame. This then allows for reducing cached version to (2×8)/(4×30)=~14% of the size, cache miss values reveal de-facto irrelevant sequence.

A different embodiment may use a different bits assignment method like 4+5+5+4 as the characteristic aspect of a hit is rather peculiar and practically the discrimination needed on the Y-axis is lower than on the X-axis.

Then the cached memory footprint of active sequence can even be downed size to 64 Kbytes range if necessary.

Use of Depth Sensors and Dual Cameras:

While the process is aimed at using 2D images, depth information may also be integrated and used without changing the way in which the present embodiments operate.

While the depth sensor precision may be used for fingers granularity analysis and operate as in the other embodiments, the depth image output from a depth sensor is more advantageous for the scene segmentation phase. The depth image may be fed directly into the hand COG detector and allow for a safer focus on nail recognition as well as a capability to change the open session method by allowing a permanent state of detection based on nail recognition on most closer object first in an hemisphere of event.

Otherwise said, coherent appearance of a fingertips following aspect of a relax hand position at a precise depth could be a sufficient criteria to trigger session on/off. As mentioned above, a posture of 2 hands close and in relaxed position is rather unusual enough to be done arbitrarily.

As a generalization of the case, multiple take-ups can be merged the same way and introduce defacto more confidence of gesture decoding. An adjustment of the process may be needed to allow comparison of queue for asserted fingers of the same kind, in order to consolidate a score.

It gives better results to directly use individual channels of a stereo camera rather than handling of a depth reconstructed from stereo take-up, because the reconstruction process level down some precious information that are usable at the level of the tips/nail detector.

In an embodiment this can be seen as taking the 2×4 set of detected tips and submit it as a 8D vector to the KB the impact will be directly on the comparison between states which will increase the quality of the resulting estimate.

Other depth oriented sensors taking up coordinates from under the hands is also compatible with the decoding approach and allow by essence a simpler detection of the hand up or down detection for row change.

The present embodiments may use multiple take-up like dual cameras but in a manner that is different from the classical approach where two cameras are used in a stereo configuration. In particular, the present embodiments may use the dual cameras in a specific approach used to specialize the purpose to aggregate multiple take-up.

Tablet Embodiment

When implemented on a tablet computer, the detection of tips at short distance may benefit from a size evaluation of fingers because of the proximity of the fingers to the sensor/camera of the tablet computer. In the case of 270 degree camera, it is expected that the hands are close to the sensor/camera, and thus, there is a need of multiple patterns for matching the fingers tips as the size change maybe sufficiently high to require revaluation.

The change is in itself information that may be integrated in the point tracking, as it is also a factor of detection. The KB search could lead to more indetermination that can be removed using this factor.

Hardware and Operating Environment

Embodiments of the invention may be implemented/operated using a client machine. The client machine can be embodied in any one of the following computing devices: a computing workstation; a desktop computer; a tablet, a laptop or notebook computer; a server; a handheld computer; a mobile telephone; a portable telecommunication device; a media playing device; a gaming system; a mobile computing device; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the client machine can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein.

Still other embodiments of the client machine include a mobile client machine that can be any one of the following: any one series of Blackberry, Playbook or other handheld device manufactured by Research In Motion Limited; the iPhone manufactured by Apple Computer; Windows Phone 7, HTC, Sony Ericsson, any telephone or computing device running the Android operating system, or any handheld or smart phone; a Pocket PC; a Pocket PC Phone; or any other handheld mobile device supporting Microsoft Windows Mobile Software, etc.

The client machine may include a display and a touch-sensitive surface and may also be connected to or including one or more other physical user interface devices, such as a physical keyboard, a mouse and/or a joystick. Capture device may include Microsoft Kinect, Primesense Sensor, Leap sensors, Panasonic DI-Imager or alike or other structured light sensors, as well as time of flight sensors, radar (sonic or microwave).

The client machine may in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine. The client machine may include a network interface to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above.

The client machine may be configured to communicate with a remote server via a communication network. The network between the client machine and the server is a connection over which data is transferred between the client machine and the server. The network can be any of the following: a local-area network (LAN); a metropolitan area network (MAN); a wide area network (WAN); a primary network comprised of multiple sub-networks located between the client machines and the servers; a primary public network with a private sub-network; a primary private network with a public sub-network; or a primary private network with a private sub-network. Still further embodiments include a network that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network that includes a wireless link where the wireless link can be an infrared channel or satellite band; or any other network type able to transfer data from client machines to servers and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines to servers, and vice versa, to accomplish the methods and systems described herein. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for interfacing with a machine using a virtual input device, said method comprising:
receiving from an image feed device an image in which a hand is present;
detecting fingertips of the hand in said image;
classifying said fingertips in a vector signature based on a position of each fingertip with respect to a reference axis defined by the remaining fingertips;
comparing said vector signature to pre-stored vector signatures representing known hand states;
if the vector signature represents a new state defining a hit state, associating a change of state to a virtual key in a first row of the virtual input device;
Sending a function represented by said virtual key to said machine for execution.

2. The method of claim 1, wherein classifying further comprises establishing the reference axis based on a point of interest in the fingertips of the index and annular fingers.

3. The method of claim 2, further comprising establishing the point of interest of each fingertip as the center of gravity (COG) of that fingertip.

4. The method of claim 3, wherein the vector signature comprises at least four vectors, the method further comprising:
establishing a first vector perpendicular to the reference axis, a magnitude of said first vector being defined by the distance between the COG of the ringer finger and the reference axis;
establishing a second vector collinear with the reference axis, a magnitude of said second vector being defined by the distance between the COG of the little finger and the point of contact between the first vector and the reference axis;

establishing a third vector perpendicular to the reference axis, a magnitude of said third vector being defined by the distance between the COG of the major and the reference axis;

establishing a fourth vector perpendicular to the reference axis, a magnitude of said fourth vector being defined by the distance between the COG of the index and the point of contact between the third vector and the reference axis.

5. The method of claim 1, wherein when fingertips are detected by group of two contiguous fingertips classification further comprises establishing the reference axis based on a point of interest of this in a group of two fingertips and the remaining fingers, and establishing a vector signature including two vectors.

6. The method of claim 5, further comprising:
establishing a fifth vector perpendicular to the reference axis, a magnitude of said fifth vector being defined by the distance between the COG of the group of fingers and the reference axis;

establishing a sixth vector collinear with the reference axis, a magnitude of said second vector being defined by the distance between the COG of one of little finger or index and the point of contact between the fifth vector and the reference axis;

comparing said vector signature to pre-stored vector signatures specific for the group of fingers representing known hand states establishing from this comparison a probability that this signature represent a specific state comparing this probability established from $5^{th}$ and $6^{th}$ vector with probabilities of signatures established from analysis of $4^{th}$ first vectors to a pre-stored vector signatures representing known hand states to establish a final probability of the asserted gesture if the final probability establish that a new state defining a hit state, associating a change of state to a virtual key in a first row of the virtual input device then send a function represented by said virtual key to said machine for execution.

7. The method of claim 1, wherein comparing comprises applying a hysteresis based compensation of probabilities to a set of successive images including:
determining a probability for each potential state that the vector signature may represent;
comparing the probability associated with each potential state with a sum of the probabilities associated with all other potential states;
Setting the potential state as the new state when the probability associated with the potential state increases over the sum of probabilities.

8. The method of claim 7, wherein determining comprises:
calculating a coordinate point of the vector signature in a multi-dimensional environment including at least four dimensions defined by at least four fingers of the hand;
for each known state, transforming a hand movement leading to the known state into a multi-dimensional trajectory in the multi-dimensional environment;
calculating a distance between the coordinate point and each trajectory of each potential state;
setting the probability of each potential state based on the distance between the coordinate point of the vector signature and the multi-dimensional trajectory of that potential state, wherein the higher the distance the lower is the probability and vice versa.

9. The method of claim 8, further comprising:
scanning distances between the coordinate point of the vector signature and each trajectory of each state within a galaxy of the multidimensional environment;
setting the probability of each state based on the distance between the coordinate point of the vector signature and the multi-dimensional trajectory of that state, wherein the higher the distance the lower is the probability and vice versa.

10. The method of claim 8, further comprising updating a knowledge base including the trajectories as an interfacing session is running, said updating including providing one or more alternative trajectories for one or more states based on typing movements of the hand during the interfacing cession.

11. The method of claim 1, further comprising:
searching for two adjacent wrists of a user's hands in said image;
establishing a virtual input plane for each hand based on a virtual wrist line of the hand;
associating a location hit by a certain fingertip in each virtual input plane to a function.

12. The method of claim 1, further comprising:
performing an assisted learning for said machine including asking a user to type specific keys;
storing vector signatures representing the typing movements in memory; and
associating each vectors signature with a hand state.

13. The method of claim 1, further comprising:
performing a dynamic training of said machine as an interfacing session is running;
storing vector signatures representing the typing movements in memory; and
associating each vector signature with a hand state.

14. The method of claim 1, further comprising:
upon detecting a specific gesture, associating the change of state to a key provided in a second row of the virtual input device, said second row being different than the first row.

15. The method of claim 1, further comprising:
Selecting the first row of the virtual input device based on a rotation angle of a wrist of the hand.

16. The method of claim 1, further comprising determining an allowable distance between the fingertips and the image feed device based upon the image resolution of the image feed device, wherein at least 16 pixels of the image are assigned to the fingertips.

17. The method of claim 1, wherein said known hand states include one: relaxed state with all fingers up, hit state with major down, hit state with index down, hit state with ring finger down, hit state with little finger down.

18. The method of claim 1, wherein the known hand states represented in the pre-stored vector signatures are the states of the user's hands.

19. The method of claim 1, wherein the known hand states represented in the pre-stored vector signatures are the states of hands of someone other than the user.

20. The method of claim 1, wherein receiving comprises receiving an image from one or more of a two dimensional (2D) image feed device, a depth sensor, and a three-dimensional image feed device.

21. The method of claim 1, wherein receiving comprises receiving different images from multiple image feed devices provided in a non-stereoscopic configuration and having different point of views for aggregating multiple take-ups and reducing detection errors.

22. The method of claim 1, further comprising aggregating ancillary intelligence prior to associating the change of state to the virtual key, said ancillary intelligence including one or more of a dictionary data, vocabulary data, and grammar rules.

23. The method of claim 1, further comprising implementing frequently used qualifier keys using thumbs.

24. A non-transitory computer readable storage medium storing one or more programs, the one or more programs comprising instructions which when executed by a computing device, cause the computing device to implement the method of claim 1.

\* \* \* \* \*